United States Patent
Bai et al.

(10) Patent No.: US 10,860,372 B1
(45) Date of Patent: Dec. 8, 2020

(54) MANAGING THROUGHPUT FAIRNESS AND QUALITY OF SERVICE IN FILE SYSTEMS

(71) Applicant: Qumulo, Inc., Seattle, WA (US)

(72) Inventors: Yuxi Bai, Seattle, WA (US); Thomas Gregory Rothschilds, Seattle, WA (US); Jonathan Michael MacLaren, Seattle, WA (US); Noah Trent Nelson, Seattle, WA (US); Kimberly Alice Fairhurst, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 16/752,509

(22) Filed: Jan. 24, 2020

(51) Int. Cl.
*G06F 9/48* (2006.01)
*G06F 16/11* (2019.01)

(52) U.S. Cl.
CPC .......... *G06F 9/4881* (2013.01); *G06F 9/4818* (2013.01); *G06F 16/122* (2019.01)

(58) Field of Classification Search
None
See application file for complete search history.

(56) References Cited

U.S. PATENT DOCUMENTS

| | | | |
|---|---|---|---|
| 5,165,031 A | 11/1992 | Pruul et al. | |
| 5,319,773 A | 6/1994 | Britton et al. | |
| 5,410,684 A | 4/1995 | Ainsworth et al. | |
| 5,442,561 A * | 8/1995 | Yoshizawa | G05B 19/41865 700/100 |
| 5,953,719 A | 9/1999 | Kleewein et al. | |
| 6,236,996 B1 | 5/2001 | Bapat et al. | |
| 6,385,641 B1 | 5/2002 | Jiang et al. | |
| 6,415,283 B1 | 7/2002 | Conklin | |
| 6,496,944 B1 | 12/2002 | Hsiao et al. | |
| 6,772,735 B2 | 8/2004 | Thexton et al. | |
| 6,874,130 B1 | 3/2005 | Baweja et al. | |

(Continued)

FOREIGN PATENT DOCUMENTS

| | | |
|---|---|---|
| EP | 1498829 A1 | 1/2005 |
| WO | WO0072201 A1 | 11/2000 |

OTHER PUBLICATIONS

Office Communication for U.S. Appl. No. 15/967,499 dated Jun. 27, 2018, pp. 1-25.

(Continued)

*Primary Examiner* — Ryan D. Coyer
(74) *Attorney, Agent, or Firm* — John W. Branch; Branch Partners PLLC

(57) ABSTRACT

Embodiments are directed to managing file systems over a network. Jobs may be provided to a storage computer in a file system. Control models may be associated with the jobs. Scores may be generated based on the control models. Each job may be associated with a score provided by its associated control model. And, each job that may be behind its corresponding schedule may be associated with a higher score value than each other job that may be either on its corresponding other schedule or ahead of its corresponding other schedule. Commands may be selected for execution based on the commands being associated with a job that may be associated with the higher score value that may be greater than score values associated with other jobs. The jobs may be ranked based on the updated scores. Subsequent commands may be selected and executed based on the ranking of the jobs.

30 Claims, 12 Drawing Sheets

(56) References Cited

U.S. PATENT DOCUMENTS

| | | | |
|---|---|---|---|
| 6,892,211 B2 | 5/2005 | Hitz et al. | |
| 6,965,903 B1 | 11/2005 | Agarwal et al. | |
| 7,213,040 B1 | 5/2007 | Stokes et al. | |
| 7,636,743 B2 | 12/2009 | Erofeev | |
| 7,693,876 B2 | 4/2010 | Hackworth et al. | |
| 7,844,580 B2 | 11/2010 | Srivastava et al. | |
| 7,937,421 B2 | 5/2011 | Mikesell et al. | |
| 8,046,378 B1 | 10/2011 | Zhuge et al. | |
| 8,108,429 B2 | 1/2012 | Sim-Tang et al. | |
| 8,296,312 B1 | 10/2012 | Leung et al. | |
| 8,364,648 B1 | 1/2013 | Sim-Tang | |
| 8,448,170 B2 | 5/2013 | Wipfel et al. | |
| 8,463,825 B1 | 6/2013 | Harty et al. | |
| 8,515,911 B1 | 8/2013 | Zhou et al. | |
| 8,612,404 B2 | 12/2013 | Bone et al. | |
| 8,661,447 B1 * | 2/2014 | Olliff | G06F 9/4887 718/102 |
| 8,776,050 B2 | 7/2014 | Plouffe et al. | |
| 8,782,655 B2 | 7/2014 | Blanding et al. | |
| 8,806,154 B1 | 8/2014 | Gupta et al. | |
| 8,838,887 B1 | 9/2014 | Burke et al. | |
| 8,838,931 B1 | 9/2014 | Marshak et al. | |
| 8,849,764 B1 | 9/2014 | Long et al. | |
| 8,868,797 B1 | 10/2014 | Kirac et al. | |
| 8,972,694 B1 | 3/2015 | Dolan et al. | |
| 9,015,214 B2 | 4/2015 | Nishida et al. | |
| 9,026,765 B1 | 5/2015 | Marshak et al. | |
| 9,047,017 B1 | 6/2015 | Dolan et al. | |
| 9,143,379 B1 | 9/2015 | Berger et al. | |
| 9,158,653 B2 | 10/2015 | Gold | |
| 9,171,145 B2 | 10/2015 | Dash et al. | |
| 9,244,975 B2 | 1/2016 | Das et al. | |
| 9,244,976 B1 | 1/2016 | Zhang et al. | |
| 9,501,487 B1 | 11/2016 | Yuan et al. | |
| 9,547,560 B1 | 1/2017 | Lee | |
| 9,753,782 B2 | 9/2017 | Fang et al. | |
| 9,753,932 B1 | 9/2017 | Brow et al. | |
| 9,785,377 B2 | 10/2017 | Shin et al. | |
| 10,140,185 B1 | 11/2018 | Lopez et al. | |
| 10,318,401 B2 | 6/2019 | Rothschilds et al. | |
| 2001/0039622 A1 | 11/2001 | Hitz et al. | |
| 2002/0083073 A1 | 6/2002 | Vaidya et al. | |
| 2002/0099691 A1 | 7/2002 | Lore et al. | |
| 2003/0033308 A1 | 2/2003 | Patel et al. | |
| 2003/0182313 A1 | 9/2003 | Federwisch et al. | |
| 2004/0255048 A1 | 12/2004 | Lev Ran et al. | |
| 2005/0015674 A1 | 1/2005 | Haugh | |
| 2005/0027748 A1 | 2/2005 | Kisley | |
| 2005/0091663 A1 | 4/2005 | Bagsby | |
| 2005/0119996 A1 | 6/2005 | Ohata et al. | |
| 2005/0195660 A1 | 9/2005 | Kavuri et al. | |
| 2005/0223019 A1 | 10/2005 | Das et al. | |
| 2006/0004890 A1 | 1/2006 | Semple et al. | |
| 2006/0053139 A1 | 3/2006 | Marzinski et al. | |
| 2006/0123005 A1 | 6/2006 | Burnett et al. | |
| 2006/0271604 A1 | 11/2006 | Shoens | |
| 2007/0027985 A1 | 2/2007 | Ramany et al. | |
| 2007/0100855 A1 | 5/2007 | Kohl | |
| 2007/0118561 A1 | 5/2007 | Idicula et al. | |
| 2008/0028006 A1 | 1/2008 | Liu et al. | |
| 2008/0059399 A1 | 3/2008 | DeLorme et al. | |
| 2008/0059541 A1 | 3/2008 | Fachan et al. | |
| 2008/0082593 A1 | 4/2008 | Komarov et al. | |
| 2008/0172366 A1 | 7/2008 | Hannel et al. | |
| 2008/0228772 A1 | 9/2008 | Plamondon | |
| 2008/0256474 A1 | 10/2008 | Chakra et al. | |
| 2008/0270928 A1 | 10/2008 | Chakra et al. | |
| 2008/0282244 A1 | 11/2008 | Wu et al. | |
| 2008/0288306 A1 | 11/2008 | MacIntyre et al. | |
| 2008/0313217 A1 | 12/2008 | Dunsmore et al. | |
| 2009/0077087 A1 | 3/2009 | Urano et al. | |
| 2009/0138500 A1 | 5/2009 | Yuan et al. | |
| 2009/0199190 A1 * | 8/2009 | Chen | G06F 9/383 718/102 |
| 2009/0222509 A1 | 9/2009 | King et al. | |
| 2009/0274047 A1 | 11/2009 | Kruys et al. | |
| 2010/0036895 A1 | 2/2010 | Boyd et al. | |
| 2010/0161557 A1 | 6/2010 | Anderson et al. | |
| 2010/0179959 A1 | 7/2010 | Shoens | |
| 2010/0217948 A1 | 8/2010 | Mason et al. | |
| 2010/0241668 A1 | 8/2010 | Susanto et al. | |
| 2010/0287512 A1 | 11/2010 | Gan et al. | |
| 2011/0039622 A1 | 2/2011 | Levenson | |
| 2011/0066668 A1 | 3/2011 | Guarraci | |
| 2011/0125799 A1 | 5/2011 | Kandasamy et al. | |
| 2011/0125973 A1 | 5/2011 | Lev et al. | |
| 2011/0202925 A1 | 8/2011 | Banerjee et al. | |
| 2011/0246724 A1 | 10/2011 | Marathe et al. | |
| 2012/0036463 A1 | 2/2012 | Krakovsky et al. | |
| 2012/0066179 A1 | 3/2012 | Saika | |
| 2012/0096059 A1 | 4/2012 | Shimizu et al. | |
| 2012/0136843 A1 | 5/2012 | Bone et al. | |
| 2012/0166478 A1 | 6/2012 | Das et al. | |
| 2012/0317079 A1 | 12/2012 | Shoens et al. | |
| 2013/0191355 A1 | 7/2013 | Bone et al. | |
| 2013/0227236 A1 | 8/2013 | Flynn et al. | |
| 2013/0311454 A1 | 11/2013 | Ezzat | |
| 2013/0318194 A1 | 11/2013 | Timbs | |
| 2014/0006354 A1 | 1/2014 | Parkinson et al. | |
| 2014/0040199 A1 | 2/2014 | Golab et al. | |
| 2014/0040693 A1 | 2/2014 | Kim et al. | |
| 2014/0095249 A1 * | 4/2014 | Tarakad | G06Q 30/0621 705/7.25 |
| 2014/0101389 A1 | 4/2014 | Nellans | |
| 2014/0156956 A1 | 6/2014 | Ezra | |
| 2014/0181441 A1 | 6/2014 | Kottomtharayil et al. | |
| 2014/0258609 A1 | 9/2014 | Cui et al. | |
| 2014/0280485 A1 | 9/2014 | A Hummaida et al. | |
| 2014/0281307 A1 | 9/2014 | Peterson et al. | |
| 2014/0281411 A1 | 9/2014 | Abdallah | |
| 2014/0344222 A1 | 11/2014 | Morris et al. | |
| 2014/0372384 A1 | 12/2014 | Long et al. | |
| 2014/0372607 A1 | 12/2014 | Gladwin et al. | |
| 2014/0373032 A1 | 12/2014 | Merry et al. | |
| 2015/0067086 A1 | 3/2015 | Adriaens et al. | |
| 2015/0067142 A1 | 3/2015 | Renkema | |
| 2015/0106145 A1 * | 4/2015 | Hamilton | G06Q 10/063114 705/7.15 |
| 2015/0135331 A1 | 5/2015 | Das | |
| 2015/0193347 A1 | 7/2015 | Kluesing et al. | |
| 2015/0215405 A1 | 7/2015 | Baek et al. | |
| 2015/0234879 A1 | 8/2015 | Baldwin et al. | |
| 2015/0242263 A1 | 8/2015 | Klose | |
| 2015/0278282 A1 | 10/2015 | Sardina et al. | |
| 2016/0034356 A1 | 2/2016 | Aron et al. | |
| 2016/0139836 A1 | 5/2016 | Nallatharnbi et al. | |
| 2016/0224430 A1 | 8/2016 | Long et al. | |
| 2016/0246816 A1 | 8/2016 | Abiri et al. | |
| 2016/0306810 A1 | 10/2016 | Ni et al. | |
| 2016/0314046 A1 | 10/2016 | Kumarasamy | |
| 2016/0335278 A1 | 11/2016 | Tabaaloute et al. | |
| 2016/0357677 A1 | 12/2016 | Hooker et al. | |
| 2016/0359859 A1 | 12/2016 | Capone | |
| 2016/0380878 A1 | 12/2016 | Bugenhagen et al. | |
| 2017/0046143 A1 | 2/2017 | Kochhar et al. | |
| 2017/0091046 A1 | 3/2017 | Bangalore et al. | |
| 2017/0163728 A1 | 6/2017 | Chawla et al. | |
| 2017/0201582 A1 | 7/2017 | Zhang et al. | |
| 2017/0286455 A1 | 10/2017 | Li et al. | |
| 2017/0316321 A1 | 11/2017 | Whitney et al. | |
| 2018/0040029 A1 | 2/2018 | Zeng et al. | |
| 2018/0288057 A1 | 10/2018 | Varadamma et al. | |
| 2018/0314423 A1 | 11/2018 | Gong et al. | |
| 2019/0095112 A1 | 3/2019 | Lingarajappa | |

OTHER PUBLICATIONS

Office Communication for U.S. Appl. No. 16/226,587 dated Feb. 25, 2019, pp. 1-65.

Office Communication for U.S. Appl. No. 15/473,051 dated Jun. 30, 2017, pp. 1-22.

Office Communication for U.S. Appl. No. 16/004,182 dated Mar. 5, 2019, pp. 1-46.

(56) References Cited

OTHER PUBLICATIONS

Office Communication for U.S. Appl. No. 16/004,182 dated Aug. 23, 2018, pp. 1-46.
Office Communication for U.S. Appl. No. 16/004,208 dated Aug. 27, 2018, pp. 1-11.
European Communication and European Search Report for European Application No. 18155779.4, dated Apr. 17, 2018, pp. 1-15.
Office Communication for U.S. Appl. No. 16/262,756 dated Aug. 5, 2019, pp. 1-48.
Office Communication for U.S. Appl. No. 16/262,756 dated Apr. 2, 2019, pp. 1-40.
Office Communication for U.S. Appl. No. 16/262,756 dated Oct. 25, 2019, pp. 1-6.
Office Communication for U.S. Appl. No. 16/659,488 dated Dec. 30, 2019, pp. 1-35.
Office Communication for U.S. Appl. No. 14/595,598 dated Dec. 31, 2019, pp. 1-23.
Office Communication for U.S. Appl. No. 16/228,716 dated Jun. 24, 2019, pp. 1-28.
Office Communication for U.S. Appl. No. 16/231,354 daated Jul. 10, 2019, pp. 1-19.
Office Communication for U.S. Appl. No. 16/226,587 dated Aug. 5, 2019, pp. 1-55.
Office Communication for U.S. Appl. No. 16/228,716 dated Feb. 28, 2019, pp. 1-27.
Office Communication for U.S. Appl. No. 16/231,354 dated Mar. 25, 2019, pp. 1-19.
Office Communication for U.S. Appl. No. 16/262,790 dated Aug. 23, 2019, pp. 1-20.
Office Communication for U.S. Appl. No. 16/262,790 dated Apr. 18, 2019, pp. 1-24.
Office Communication for U.S. Appl. No. 16/234,395 dated Aug. 8, 2019, pp. 1-28.
Office Communication for U.S. Appl. No. 16/234,334 dated Apr. 5, 2019, pp. 1-24.
Office Communication for U.S. Appl. No. 16/234,395 dated Mar. 28, 2019, pp. 1-36.
Kappes et al. "Virtualization-aware Access Control for Multitenant Filesystems", University of Ioannina, Greece, Technical Report No. DCS2013-1, 8, 61-64. (Year: 2013), pp. 1-6.
Hitz et al. "Merging NT and UNIX filesystem permissions", In Proceedings of the 2nd conference on USENIX Windows NT Symposium—vol. 2 (pp. 10-10). USENIX Association. (Year: Aug. 1998), pp. 1-10.
Office Communication for U.S. Appl. No. 16/234,334 dated Oct. 11, 2019, pp. 1-22.
Official Communication for U.S. Appl. No. 15/473,051 dated Jun. 30, 2017, pp. 1-23.
Official Communication for U.S. Appl. No. 15/694,604 dated Jun. 3, 2019, pp. 1-14.
Official Communication for U.S. Appl. No. 16/004,182 dated Aug. 23, 2018, pp. 1-46.
Official Communication for U.S. Appl. No. 16/004,182 dated Mar. 5, 2019, pp. 1-46.
Official Communication for U.S. Appl. No. 16/004,182 dated Jul. 3, 2019, pp. 1-50.
Official Communication for U.S. Appl. No. 16/004,182 dated May 22, 2019, pp. 1-6.
Official Communication for U.S. Appl. No. 16/004,182 dated Jan. 7, 2020, pp. 1-54.
Official Communication for U.S. Appl. No. 14/595,043 dated May 4, 2017, pp. 1-38.
Official Communication for U.S. Appl. No. 14/595,043 dated Feb. 23, 2018, pp. 1-22.
Official Communication for U.S. Appl. No. 14/595,043 dated May 25, 2018, pp. 1-14.
Official Communication for U.S. Appl. No. 14/595,043 dated Oct. 5, 2018, pp. 1-26.
Official Communication for U.S. Appl. No. 14/595,043 dated Jun. 7, 2019, pp. 1-29.
Official Communication for U.S. Appl. No. 14/595,043 dated Aug. 27, 2019, pp. 1-34.
Official Communication for U.S. Appl. No. 14/658,015 dated Apr. 27, 2017, pp. 1-8.
Official Communication for U.S. Appl. No. 14/658,015 dated Jan. 4, 2018, pp. 1-35.
Official Communication for U.S. Appl. No. 14/658,015 dated Jul. 13, 2018, pp. 1-18.
Official Communication for U.S. Appl. No. 14/859,061 dated Sep. 22, 2017, pp. 1-29.
Official Communication for U.S. Appl. No. 15/831,236 dated Mar. 30, 2018, pp. 1-8.
Official Communication for U.S. Appl. No. 15/831,236 dated Aug. 15, 2018, pp. 1-27.
Official Communication for U.S. Appl. No. 14/659,114 dated Jul. 24, 2017, pp. 1-165.
Official Communication for U.S. Appl. No. 14/859,114 dated Feb. 21, 2018, pp. 1-27.
Official Communication for U.S. Appl. No. 14/859,114 dated May 11, 2018, pp. 1-7.
Office Communication for U.S. Appl. No. 15/694,604 dated Nov. 20, 2019, pp. 1-24.
Office Communication for U.S. Appl. No. 14/859,114 dated Jun. 27, 2018, pp. 1-40.
Office Communication for U.S. Appl. No. 14/859,114 dated Nov. 19, 2018, pp. 1-41.
Office Communication for U.S. Appl. No. 14/859,114 dated Jan. 31, 2019, pp. 1-5.
Office Communication for U.S. Appl. No. 14/859,114 dated Mar. 7, 2019, pp. 1-39.
Office Communication for U.S. Appl. No. 14/859,114 dated Sep. 13, 2019, pp. 1-8.
Office Communication for U.S. Appl. No. 14/659,114 dated Nov. 26, 2019, pp. 1-43.
Office Communication for U.S. Appl. No. 15/288,853 dated Sep. 19, 2018, pp. 1-27.
Chimera, "Value Bars: An Information Visualization and Navigation Tool for Multi-attribute Listings", CHI '92, Monterey, CA, May 3-7, 1992, pp. 293-294.
Office Communication for U.S. Appl. No. 15/288,853 dated Mar. 25, 2019, pp. 1-25.
Cudre-Mauroux, et al., "TrajStore: An Adaptive Storage System for Very Large Trajectory Sets", ICDE 2010, Long Beach, CA, Mar. 1-6, 2010, pp. 109-120.
Office Communication for U.S. Appl. No. 16/436,825 dated Jul. 11, 2019, pp. 1-22.
Office Communication for U.S. Appl. No. 15/474,047 dated Sep. 18, 2017, p. 1-24.
Office Communication for U.S. Appl. No. 15/474,047 dated Mar. 9, 2018, pp. 1-12.
Office Communication for U.S. Appl. No. 15/474,047 dated Jun. 11, 2018, pp. 1-7.
Office Communication for U.S. Appl. No. 15/474,047 dated Aug. 15, 2018, pp. 1-24.
Office Communication for U.S. Appl. No. 15/957,809 dated Jun. 28, 2018, pp. 1-42.
Office Communication for U.S. Appl. No. 15/957,809 dated Jan. 24, 2019, pp. 1-24.
Office Communication for U.S. Appl. No. 16/434,157 dated Jul. 25, 2019, pp. 1-16.
Office Communication for U.S. Appl. No. 15/854,447 dated May 6, 2019, pp. 1-31.
Office Communication for U.S. Appl. No. 16/505,562 dated Aug. 30, 2019, pp. 1-46.
European Communication and European Search Report for European Application No. 17206518.7 dated Apr. 5, 2018, pp. 1-8.
Karatza et al. Epoch load sharing in a network of workstations, Simulation Symposium, 2001. Proceedings. 34th Annual Apr. 22-26, 2001, Piscataway, NJ, USA, IEEE, Apr. 22, 2001 (Apr. 22, 2001), pp. 36-42, XP010541274, ISBN: 978-0-7695-1092-7.
Office Communication for U.S. Appl. No. 16/125,573 dated Nov. 21, 2019, pp. 1-24.

(56) References Cited

OTHER PUBLICATIONS

Office Communication for U.S. Appl. No. 16/226,587 dated Oct. 24, 2019, pp. 1-6.
Office Communication for U.S. Appl. No. 16/234,334 dated Jan. 16, 2020, pp. 1-8.
Office Communication for U.S. Appl. No. 16/262,756 dated Jan. 28, 2020, pp. 1-27.
Office Communication for U.S. Appl. No. 16/434,157 dated Jan. 29, 2020, pp. 1-12.
Office Communication for U.S. Appl. No. 15/967,499 dated Jun. 27, 2018.
Office Communication for U.S. Appl. No. 16/226,587 dated Feb. 25, 2019.
Office Communication for U.S. Appl. No. 15/473,051 dated Jun. 30, 2017.
Office Communication for U.S. Appl. No. 16/004,182 dated Mar. 5, 2019.
Office Communication for U.S. Appl. No. 16/004,182 dated Aug. 23, 2018.
Office Communication for U.S. Appl. No. 16/004,208 dated Aug. 27, 2018.
European Communication and European Search Report for European Application No. 18155779.4, dated Apr. 17, 2018.
Office Communication for U.S. Appl. No. 16/262,756 dated Aug. 5, 2019.
Office Communication for U.S. Appl. No. 16/262,756 dated on Apr. 2, 2019.
Office Communication for U.S. Appl. No. 16/262,756 dated Oct. 25, 2019.
Office Communication for U.S. Appl. No. 16/659,488 dated Dec. 30, 2019.
Office Communication for U.S. Appl. No. 14/595,598 dated Dec. 31, 2019.
Office Communication for U.S. Appl. No. 16/228,716 dated Jun. 24, 2019.
Office Communication for U.S. Appl. No. 16/231,354 dated Jul. 10, 2019.
Office Communication for U.S. Appl. No. 16/226,587 dated Aug. 5, 2019.
Office Communication for U.S. Appl. No. 16/228,716 dated Feb. 28, 2019.
Office Communication for U.S. Appl. No. 16/231,354 dated Mar. 25, 2019.
Office Communication for U.S. Appl. No. 16/262,790 dated Aug. 23, 2019.
Office Communication for U.S. Appl. No. 16/262,790 dated Apr. 18, 2019.
Office Communication for U.S. Appl. No. 16/234,395 dated Aug. 8, 2019.
Office Communication for U.S. Patent Application No. 16/234,334 dated Apr. 5, 2019.
Office Communication for U.S. Appl. No. 16/234,395 dated Mar. 28, 2019.
Office Communication for U.S. Appl. No. 16/234,334 dated Oct. 11, 2019.
Official Communication for U.S. Appl. No. 15/473,051 dated Jun. 30, 2017.
European Communication and European Search Report for European Application No. 18155779.4.
Official Communication for U.S. Appl. No. 15/694,604 dated Jun. 3, 2019.
Official Communication for U.S. Appl. No. 16/004,182 dated Aug. 23, 2018.
Official Communication for U.S. Appl. No. 16/004,182 dated Mar. 5, 2019.
Official Communication for U.S. Appl. No. 16/004,182 dated Jul. 3, 2019.
Official Communication for U.S. Appl. No. 16/004,182 dated May 22, 2019.
Official Communication for U.S. Appl. No. 16/004,182 dated Jan. 7, 2020.
Official Communication for U.S. Appl. No. 14/595,043 dated May 4, 2017.
Official Communication for U.S. Appl. No. 14/595,043 dated Feb. 23, 2018.
Official Communication for U.S. Appl. No. 14/595,043 dated May 25, 2018.
Official Communication for U.S. Appl. No. 14/595,043 dated Oct. 5, 2018.
Official Communication for U.S. Appl. No. 14/595,043 dated Jun. 7, 2019.
Official Communication for U.S. Appl. No. 14/595,043 dated Aug. 27, 2019.
Official Communication for U.S. Appl. No. 14/658,015 dated Apr. 27, 2017.
Official Communication for U.S. Appl. No. 14/658,015 dated Jan. 4, 2018.
Official Communication for U.S. Appl. No. 14/658,015 dated Jul. 13, 2018.
Official Communication for U.S. Appl. No. 14/859,061 dated Sep. 22, 2017.
Official Communication for U.S. Appl. No. 15/831,236 dated Mar. 30, 2018.
Official Communication for U.S. Appl. No. 15/831,236 dated Aug. 15, 2018.
Official Communication for U.S. Appl. No. 14/859,114 dated Jul. 24, 2017.
Official Communication for U.S. Appl. No. 14/859,114 dated Feb. 21, 2018.
Official Communication for U.S. Appl. No. 14/859,114 dated May 11, 2018.
Office Communication for U.S. Appl. No. 15/694,604 dated Nov. 20, 2019.
Office Communication for U.S. Appl. No. 14/859,114 dated Jun. 27, 2018.
Office Communication for U.S. Appl. No. 14/859,114 dated Nov. 19, 2018.
Office Communication for U.S. Appl. No. 14/859,114 dated Jan. 31, 2019.
Office Communication for U.S. Appl. No. 14/859,114 dated Mar. 7, 2019.
Office Communication for U.S. Appl. No. 14/859,114 dated Sep. 13, 2019.
Office Communication for U.S. Appl. No. 14/859,114 dated Nov. 26, 2019.
Office Communication for U.S. Appl. No. 15/288,853 dated Sep. 19, 2018.
Office Communication for U.S. Appl. No. 15/288,853 dated Mar. 25, 2019.
Office Communication for U.S. Appl. No. 16/436,825 dated Jul. 11, 2019.
Office Communication for U.S. Appl. No. 15/474,047 dated Sep. 18, 2017.
Office Communication for U.S. Appl. No. 15/474,047 dated Mar. 9, 2018.
Office Communication for U.S. Appl. No. 15/474,047 dated Jun. 11, 2018.
Office Communication for U.S. Appl. No. 15/474,047 dated Aug. 15, 2018.
Office Communication for U.S. Appl. No. 15/957,809 dated Jun. 28, 2018.
Office Communication for U.S. Appl. No. 15/957,809 dated Jan. 24, 2019.
Office Communication for U.S. Appl. No. 16/434,157 dated Jul. 25, 2019.
Office Communication for U.S. Appl. No. 15/854,447 dated May 6, 2019.
Office Communication for U.S. Appl. No. 16/505,562 dated Aug. 30, 2019.
European Communication and European Search Report for European Application No. 17206518.7 dated Apr. 5, 2018.

(56) References Cited

OTHER PUBLICATIONS

Office Communication for U.S. Appl. No. 16/125,573 dated Nov. 21, 2019.
Office Communication for U.S. Appl. No. 16/226,587 dated Oct. 24, 2019.
Office Communication for U.S. Appl. No. 16/262,756 dated Jan. 28, 2020.
Office Communication for U.S. Appl. No. 16/434,157 dated Jan. 29, 2020.

* cited by examiner

US 10,860,372 B1

MANAGING THROUGHPUT FAIRNESS AND QUALITY OF SERVICE IN FILE SYSTEMS

TECHNICAL FIELD

The present invention relates generally to file systems, and more particularly, but not exclusively, to managing service allocation for distributed file systems.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. In many cases, distributed file systems may be comprised of many storage devices (e.g., hard drives, solid state drives, or the like) that may independently experience failures. Accordingly, many file systems may execute a variety of maintenance or support jobs to maintain stability, correctness, availability, or the like. In some cases, such jobs may be long running or resource intensive. Also, in some cases, some user jobs may be long running or resource intensive. But, often, many user jobs may be short running jobs where users expect low latency and a high level of responsiveness. However, resources consumed by some long running jobs may reduce the responsiveness of some user jobs that users may otherwise expect to be responsive. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
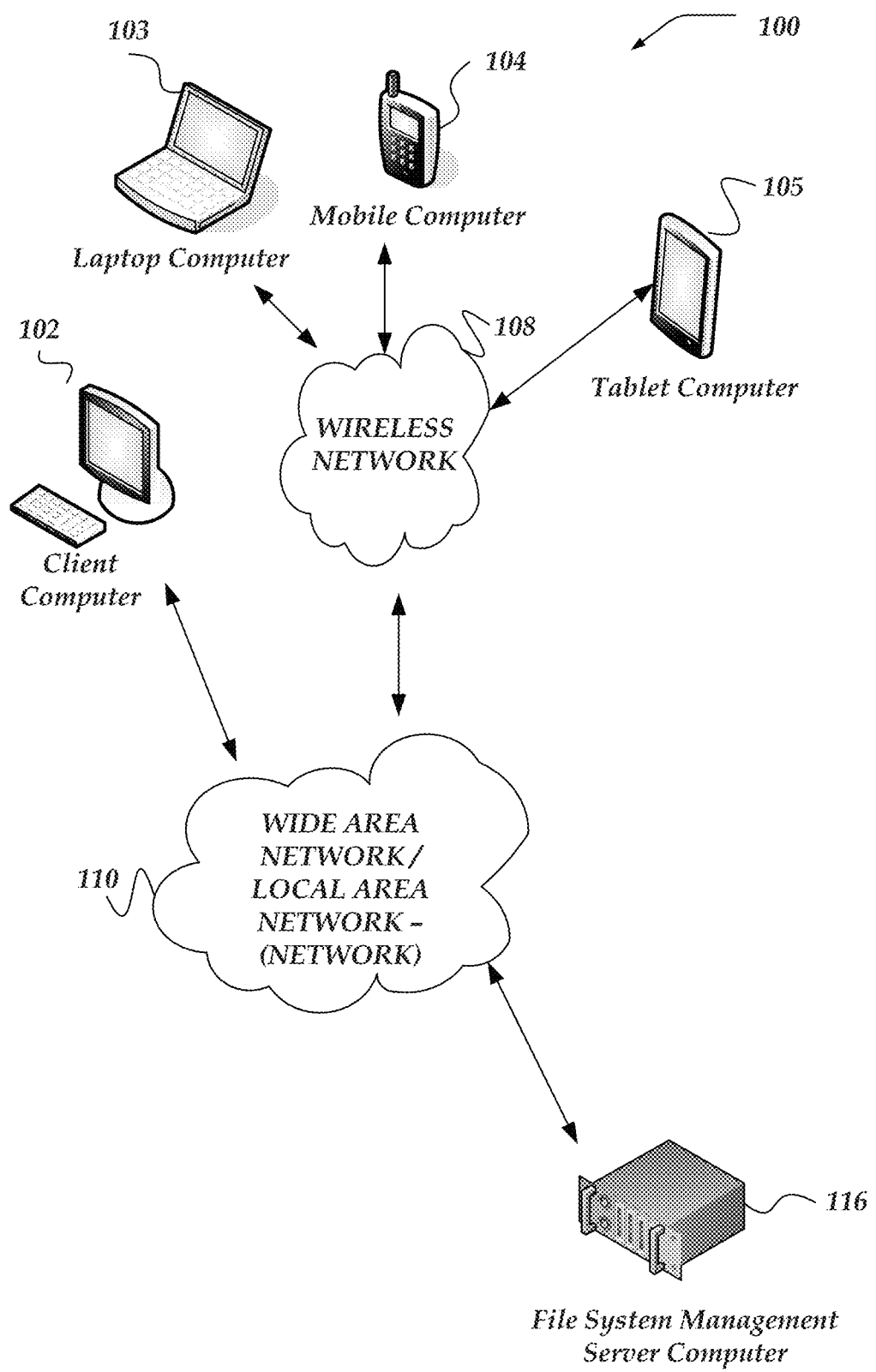
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage devices and be stored on and executed by one or more general purpose computers, thus creating a special purpose computer configured to provide the engine.

As used herein the terms "file system object," or "object" refer to entities stored in a file system. These may include files, directories, or the like. In this document for brevity and clarity all objects stored in a file system may be referred to as file system objects.

As used herein the term "file system" refers to storage systems that may include one or more storage devices, one or more servers, one or more nodes, or the like. Typically, file systems may be arranged to support one or more conventional/standards-based file system protocols, or the like. In some cases, file systems may be distributed across multiple nodes, servers, networks, or the like.

As used herein the term "storage unit" refers to storage component in a file system. Accordingly, storage devices, storage enclosures, cluster nodes, clusters, or the like, be considered storage units. The particular component represented by a storage unit may depend on context. For example, in some cases, a single hard drive may be considered a storage unit, where in other cases, a node computer in distributed file system may be considered a single storage unit, even though the node computer may include server hard drives, solid state drives, or the like.

As used herein the term "configuration information" refers to information that may include rule based policies, pattern matching, scripts (e.g., computer readable instructions), parameter values, settings, or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing file systems over a network. In one or more of the various embodiments, one or more jobs (client jobs) may be provided to a storage computer in a file system. In some embodiments, the storage computer may be associated with one or more storage devices. And, in some embodiments, the file system may include one or more storage computers.

In one or more of the various embodiments, one or more control models may be associated with the one or more jobs based on one or more characteristics of the one or more jobs. In one or more of the various embodiments, associating the one or more control models with the one or more jobs may include: determining one or more interactive jobs and one or more long-running jobs based on the one or more characteristic; associating each interactive job a first type of control model such that score values generated by the first control model may be equivalent to zero; associating each long-running jobs with a second type of control model such that score values generated by the second type of control model may be based on a remainder of work to be completed by the each long-running job; or the like.

In one or more of the various embodiments, one or more scores (target scores) may be generated based on the one or more control models associated with each job. In some embodiments, each job may be associated with a score provided by its associated control model. And, in some embodiments, each job that may be behind its corresponding schedule may be associated with a higher score value than each other job that may be either on its corresponding other schedule or ahead of its corresponding other schedule. In one or more of the various embodiments, generating the one or more scores may include: providing a portion of the one or more metrics to a control model associated with the job; generating an error value based on a difference of a setpoint value and the portion of the one or more metrics such that the setpoint value may be defined by the control model; providing the error value to one or more functions, including a current value function, a historic function, or a rate of change function to generate a score such that the score may be a dimensionless scalar value; or the like.

In one or more of the various embodiments, one or more commands may be selected for execution on the one or more storage devices based on the one or more commands being associated with a job that may be associated with the higher score value that may be greater than one or more score values associated with one or more other jobs. In one or more of the various embodiments, selecting the one or more commands for execution may include: increasing a number of commands for the one or more jobs that may be behind schedule; decreasing the number of commands for the one or more other jobs if the one or more jobs that may be ahead of schedule; or the like.

In one or more of the various embodiments, in response to one job being provided to the storage computer, selecting the one or more commands for execution may include: executing one command if the one job is on schedule; executing one command if the one job is ahead of schedule; executing more than one command when the one job is behind of schedule; or the like.

In one or more of the various embodiments, the one or more jobs may be ranked based on the one or more updated scores. In some embodiments, one or more subsequent commands may be selected and executed based on the ranking of the one or more jobs.

In one or more of the various embodiments, the one or more metrics associated with the execution of the one or more jobs may be monitored such that the one or more metrics may be defined by each control model.

In one or more of the various embodiments, the one or more scores may be updated based on the one or more control models and one or more metrics. In one or more of the various embodiments, updating the one or more scores may include: employing the one or more control models and the one or more metrics to determine one or more executing jobs that may be one or more of ahead-of-schedule, on-schedule, or behind-schedule; increasing each score associated with each behind-schedule executing job; decreasing each score associated with each ahead-of-schedule executing job; setting each score associated with each on-schedule job to zero; or the like.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, file system management server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, file system management server computer 116, or other computers. Client computers 102-105 may further be configured to include a client application that enables an end-user to log into an end-user account that may be managed by another computer, such as file system management server computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by file system management server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HS-DPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, file system management server computer 116, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanisms and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of file system management server computer 116 is described in more detail below in conjunction with FIG. 3. Although FIG. 1 illustrates file system management server computer 116, or the like, each as a single computer, the innovations or embodiments are not so limited. For example, one or more functions of file system management server computer 116, or the like, may be distributed across one or more distinct network computers. Moreover, in one or more embodiments, file system management server computer 116 may be implemented using a plurality of network computers. Further, in one or more of the various embodiments, file system management server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
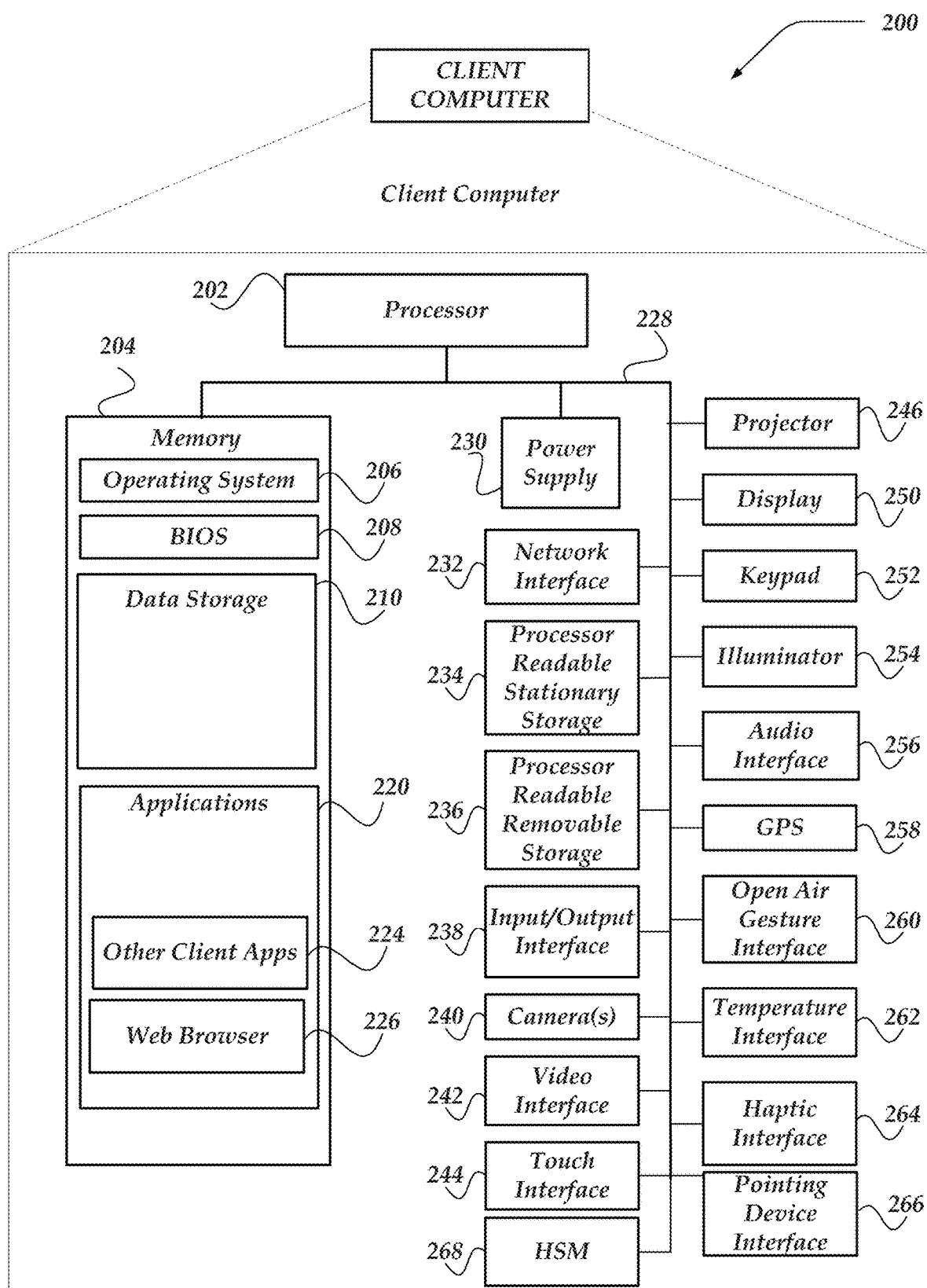
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measure or maintain an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store key pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client user interface engine 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
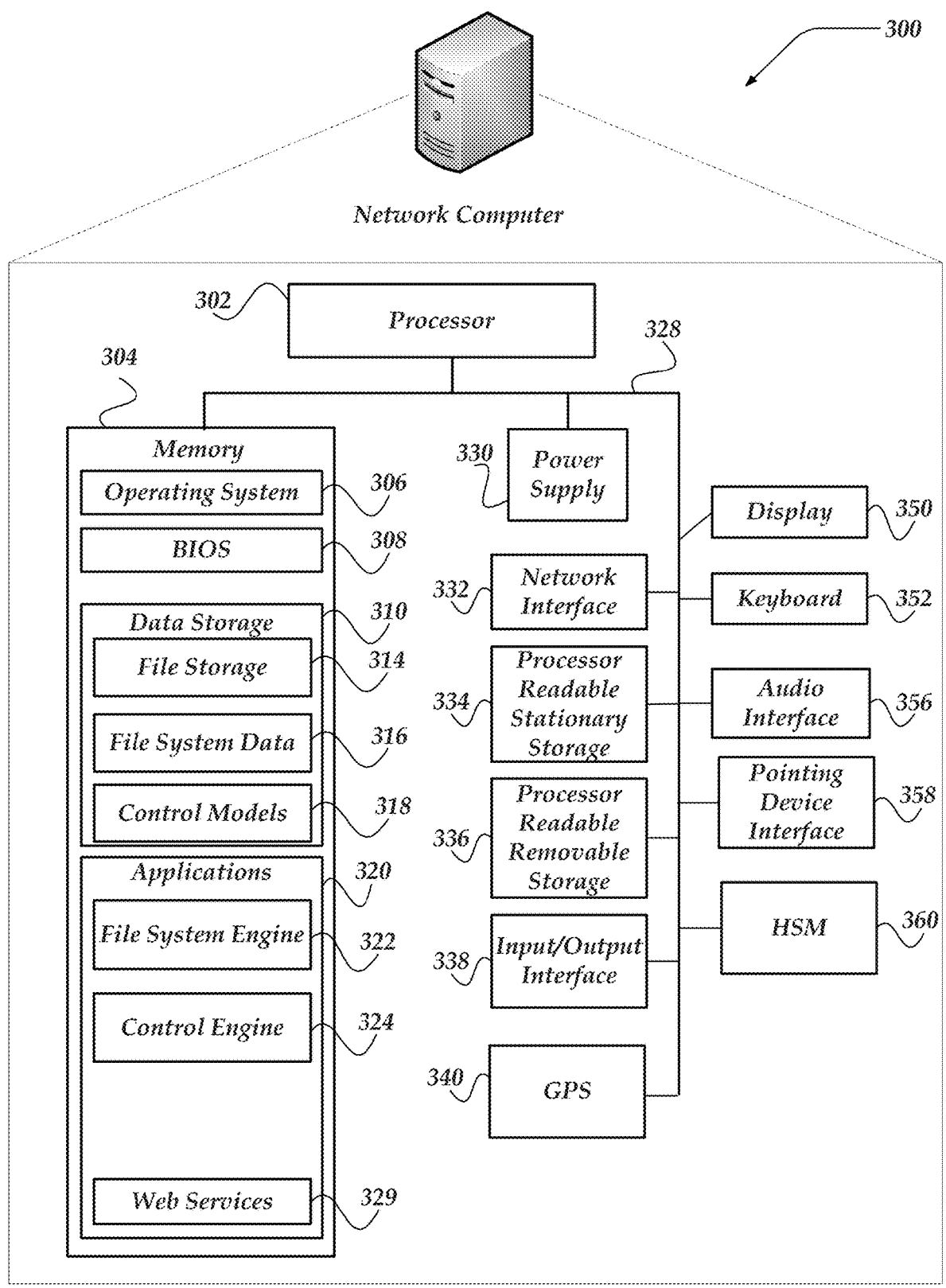
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a file system management server computer such as file system management server computer 116, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, control engine 324, web services 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 314, file system data 316, control models 318, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, control engine 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, control engine 324, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, control engine 324, web services 329, or the like, may be provisioned and de-commissioned automatically.

Also, in one or more of the various embodiments, file system engine 322, control engine 324, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store key pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
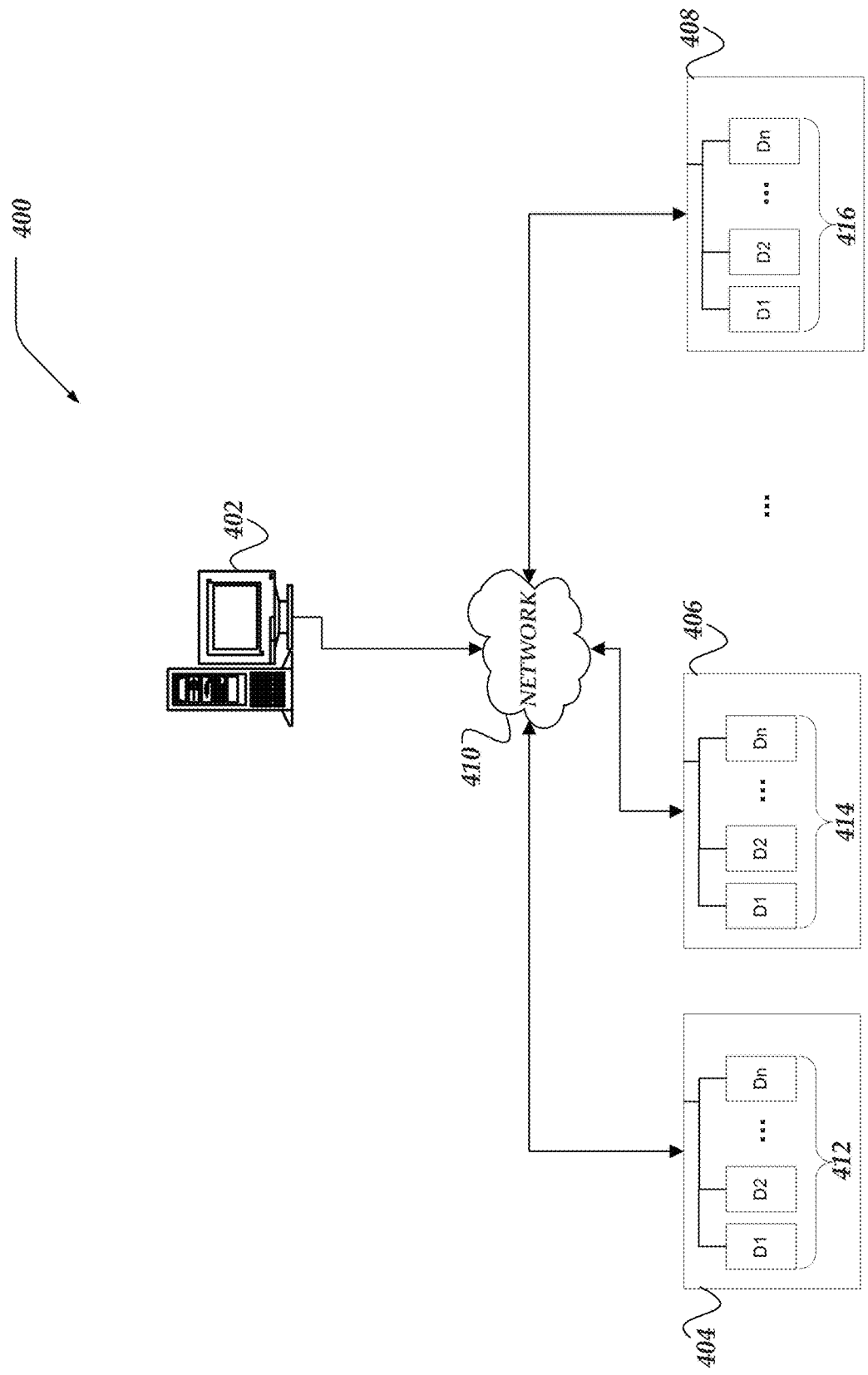
FIG. 4 illustrates a logical architecture of a file system for managing throughput fairness and quality of service in file systems in accordance with one or more of the various embodiments.

FIG. 4 illustrates a logical architecture of file system 400 for managing throughput fairness and quality of service in file systems in accordance with one or more of the various embodiments. In at least one of the various embodiments, file system 400 may be comprised of a file system management server computer, such as, file system management server computer 402, as well as, one or more storage computers, such as, storage computer 404, storage computer 406, storage computer 408, or the like. In at least one of the various embodiments, each computer may be interconnected over a network, such as, network 410. In at least one of the various embodiments, network 410 may be considered to be arranged to be similar to wireless network 108 or network 110.

In at least one of the various embodiments, the storage computers may be arranged to include one or more storage devices, such as, storage devices 412, storage devices 414, or storage devices 416. In various embodiments, storage computers may include more or fewer storage devices than illustrated in FIG. 4. In at least one of the various embodiments, storage computers may include a single storage device. And, in some embodiments, one or more storage computers may be arranged to be included in an enclosure or chassis which in turn may be interconnected to other computers and/or storage computers over network 410.

In one or more of the various embodiments, storage computers may be employed to provide a file system object store for storing the file system objects that contain or represent the information stored in file system 400.

In at least one of the various embodiments, the functionality of file system management server computer 402 may be incorporated directly into one or more storage computers, such as, storage computer 404, storage computer 406, storage computer 408, or the like. In such embodiments a file system engine, such as, file system engine 322 may be operative on one or more of the storage computers.

In one or more of the various embodiments, the implementation details that enable file system 402 to operate may be hidden from clients, such that they may be arranged to use file system 402 the same way they use other conventional file systems, including local file systems. Accordingly, in one or more of the various embodiments, clients may be unaware that they are using a distributed file system that supports predictive performance analysis because file system engines may be arranged to provide an interface or behavior that may be similar to one or more standard file systems.

Also, while file system 400 is illustrated as using one file system management computer, the innovations are not so limited. Innovations herein contemplate file systems that include two or more file system management computers or one or more file system object data stores. In some embodiments, file system object stores may be located remotely from one or more file system management computers. Also, a logical file system object store or file system may be spread across two or more cloud computing environments, storage clusters, or the like.

Figure 5:
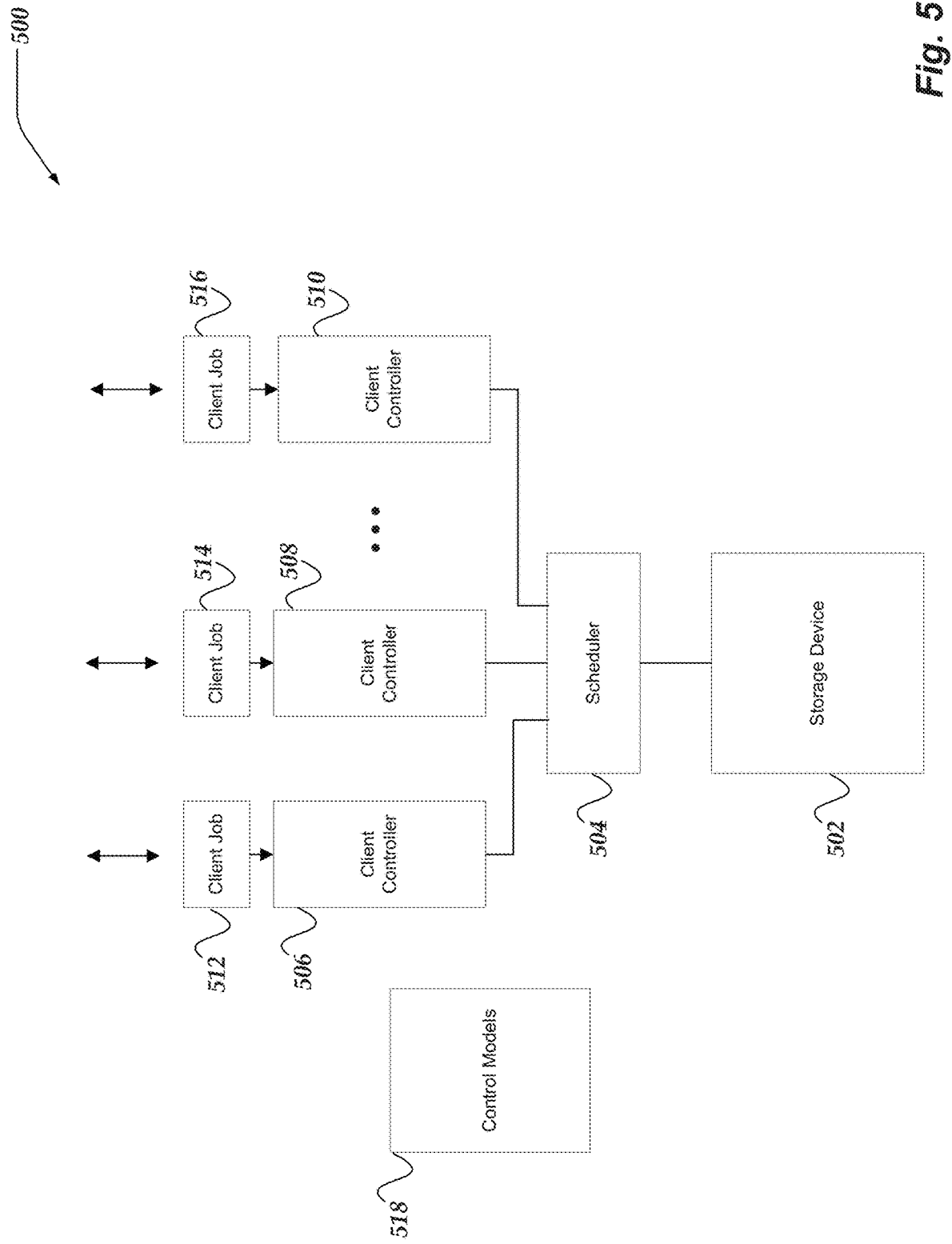
FIG. 5 illustrates a logical schematic of a system for managing throughput fairness and quality of service in file systems in accordance with one or more of the various embodiments.

FIG. 5 illustrates a logical schematic of system 500 for managing throughput fairness and quality of service in file systems in accordance with one or more of the various embodiments. In this example, for some embodiments, system 500 includes a storage device, such as, storage device 502. In this example, storage device 502 represents a device, such as, a hard drive. For brevity or clarity, various components common to hard drives, or the like, such as, platters, spindles, read-write arm(s), actuator motor(s), control interfaces, data buses, memory, firmware, power regulators, or the like, are omitted here. One of ordinary skill in the art will appreciate that such elements, or the like, may be included in a storage device. Further, in one or more of the various embodiments, other innovations described herein are not limited to hard-drive storage devices. One of ordinary skill in the art will appreciate that these innovations anticipate other block storage devices, file storage devices, object storage devices, or the like, or combination thereof.

In one or more of the various embodiments, storage devices, such as, storage device 502 may be arranged to support one or more command protocols or one or more data protocols, such as, Serial Advanced Technology Attachment (SATA), Advance Host Controller Interface (AHCI), custom protocols, or the like, that enable storage computers to perform various actions related to using the storage device in a file system, including, reading data, writing data, flushing buffers, identifying devices, checking device status, or the like. In some embodiments, storage devices may be arranged to accept a finite number of commands at given time. In some embodiments, the configuration/content/format of commands may vary depending on the protocol used or the make or model of the device. In some embodiments, if more than one command may be provided to a storage device, those commands may be executed in the sequence they are provided to the storage device.

For example, in some embodiments, if twenty read commands are provided to a storage device, in some cases (depending on the type of device or protocol), all twenty commands may be executed by the storage device in the order they are provided. Thus, in some embodiments, in this example, if twenty low priority commands are sent to a storage device, a later arriving high priority command cannot execute until the first twenty low priority commands may be executed. Accordingly, in some embodiments, a file system may provide a scheduler, such as, scheduler 504 to determine which commands may be sent to storage device 502.

In one or more of the various embodiments, system 500 may be arranged to include one or more client controllers, such as, client controller 506, client controller 508, client controller 510, or the like. In some embodiments, client controllers may be arranged to provide signals that schedulers may employ to determine the commands to provide to storage device 502.

In one or more of the various embodiments, client jobs, such as, client job 512, client job 514, client job 516, or the like, represent file system tasks that file system may be performing on behalf of various clients of the file system.

In one or more of the various embodiments, one or more client jobs may be maintenance jobs associated with the operation or support of the file system. For example, in some embodiments, these may include replication jobs, recovery jobs, re-striping jobs, or the like, that may be responsible for maintaining stability, availability, or correctness of a distributed file system.

Also, in one or more of the various embodiments, one or more client jobs may be associated with regular (human) users that may be interacting with the file system. For example, in some embodiments, such client jobs may include users browsing a file directory, opening a file, saving a file, or the like.

In one or more of the various embodiments, control engines may be arranged to provide one or more client controllers to monitor the status or performance of client jobs to help ensure that the file system maintains a level of quality of service (e.g., QoS) required for a given job. Accordingly, in one or more of the various embodiments, each client job may be associated with its own client controller. Thus, in some embodiments, the status of each individual may be determined independently.

In one or more of the various embodiments, client controllers may be arranged to employ control models selected from control models 518 to determine if a client job may be running on schedule. Accordingly, in one or more of the various embodiments, each client controller (or client job) may be associated with a control model that determines if the client job may be on schedule.

In one or more of the various embodiments, file systems may be arranged to provide different types of control models that may be associated with different types of client jobs. Accordingly, in one or more of the various embodiments, performance criteria, metrics, or the like, may be tailored to the characteristics or requirements of the different jobs or job types.

In one or more of the various embodiments, the different types of control models may be arranged to output a target score that a scheduler, such as, scheduler 504 may employ to allocate or select job commands for execution on the storage device.

In one or more of the various embodiments, control models may be arranged to provide a target score that indicates if its associated client job may be running ahead of schedule, on schedule, or behind schedule. For example, in some embodiments, if the target score is a positive value, the job may be considered to be ahead of schedule. In contrast, in some embodiments, if the score is a negative value, the job may be considered to be behind schedule. Note, in some embodiments, the 'meaning' of ahead or behind or schedule, may be dependent on the particular client job as determined by its associated control model.

However, in some embodiments, scheduler 504 may be arranged to assume if a job target score is positive, the job may be slowed without consequence. Similarly, in some embodiments, if a target score is negative, the job will require speeding up to complete on-time.

Further, in one or more of the various embodiments, the magnitude of a target score may be employed to compare pending client jobs against each other. Accordingly, in some embodiments, a client job associated with a higher magnitude score may be assumed to be farther ahead or farther behind of a job associated with a score with a lower magnitude. For example, in one or more of the various embodiments, if job A has a target score of 1000 and job B has a target score of 100, job A may be considered to be further ahead than job B. Similarly, for example, if job X has a target score of −1000 and job Y has a target score of −100, job X may be considered to be further behind than job Y.

In one or more of the various embodiments, schedulers may be enabled to speed up or slow down client jobs by adjusting the number job commands executed for a given client job. For example, in some embodiments, executing more job commands than one at a time may be more efficient for a hard drive storage device, because it may reduce seeks if the job commands may be related to data locations that may be contiguous on the physical media. Accordingly, in some embodiments, schedulers may enable a behind-schedule job to catch up if more job commands for that job may be executed because doing so may it improve hard drive efficiency.

In one or more of the various embodiments, control models 518 may be a data store that includes one or more control models associated with client jobs. In one or more of the various embodiments, controller engines, or the like, may be arranged to evaluate meta-data associated with incoming jobs to assign each incoming job a control model. In one or more of the various embodiments, control engines may be arranged to employ rules, instructions, lookup tables, or the like, provided via configuration information to determine which control models may be associated with a client jobs.

In one or more of the various embodiments, control engines may be arranged to monitor or otherwise measure the accuracy or efficiency of control models. Accordingly, in some embodiments, control models may be graded based on various performance criteria. In some embodiments, if there may be two or more control models for the same client job type, they may be automatically compared to determine if one may be better than another.

Figure 6:
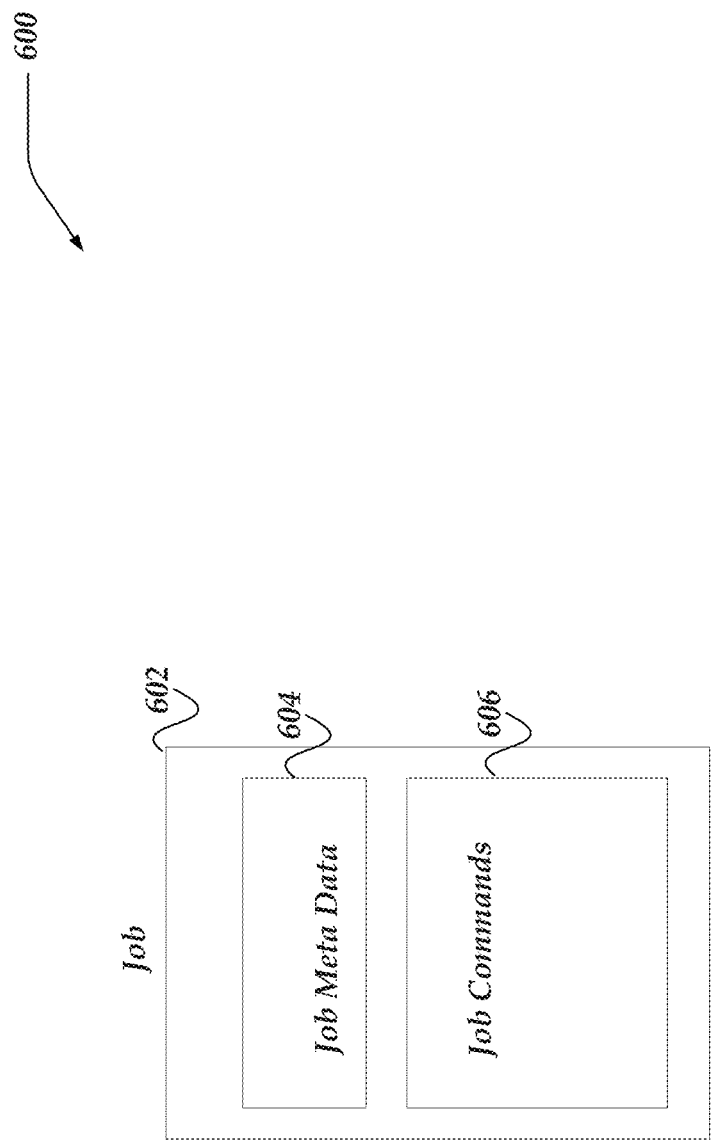
FIG. 6 illustrates a logical schematic of a client job for managing throughput fairness and quality of service in file systems in accordance with one or more of the various embodiments.

FIG. 6 illustrates a logical schematic of client job 600 for managing throughput fairness and quality of service in file systems in accordance with one or more of the various embodiments. As described above, in some embodiments, client jobs may be provided to a controller engine that may associate client jobs with control models.

In one or more of the various embodiments, client jobs may be comprised of one or more components, such as, job envelope 602, job meta-data 604, job commands 606, or the like. In one or more of the various embodiments, job envelopes may be considered a data structure that may encapsulate different portions of a client job. For example, in some embodiments, job envelopes may be classes, structures, tuples, objects, records, or the like, that enable job meta-data and job commands to be associated.

In one or more of the various embodiments, job meta-data, such as, job meta-data 604 may be arranged to include various information associated with a job, such as, job type, job owner, job size, job status, or the like. In some embodiments, the particular meta-data included with a job may vary depending on the type of job, or the like. In some embodiments, the control models for a particular job type may require particular meta-data. Accordingly, the job meta-data may be arranged to conform to the requirements of one or more control models.

In one or more of the various embodiments, job commands, such as, job commands 606 may be a sequence of one or more commands that comprise the job. In some embodiments, the job commands may be low level commands that may be directly executed or interpreted by storage devices or storage device drivers. Alternatively, in some embodiments, job commands may be defined using a conventional computer language or a domain specific language. In some embodiments, job commands may be arranged to implement the file system operations associated with client jobs. For example, in some embodiments, job commands may contain a list of SATA or AHCI command codes for a particular storage device. Also, for example, in some embodiments, job commands may include higher level commands that may be translated or compiled onto lower level SATA or AHCI commands at runtime.

Figure 7:
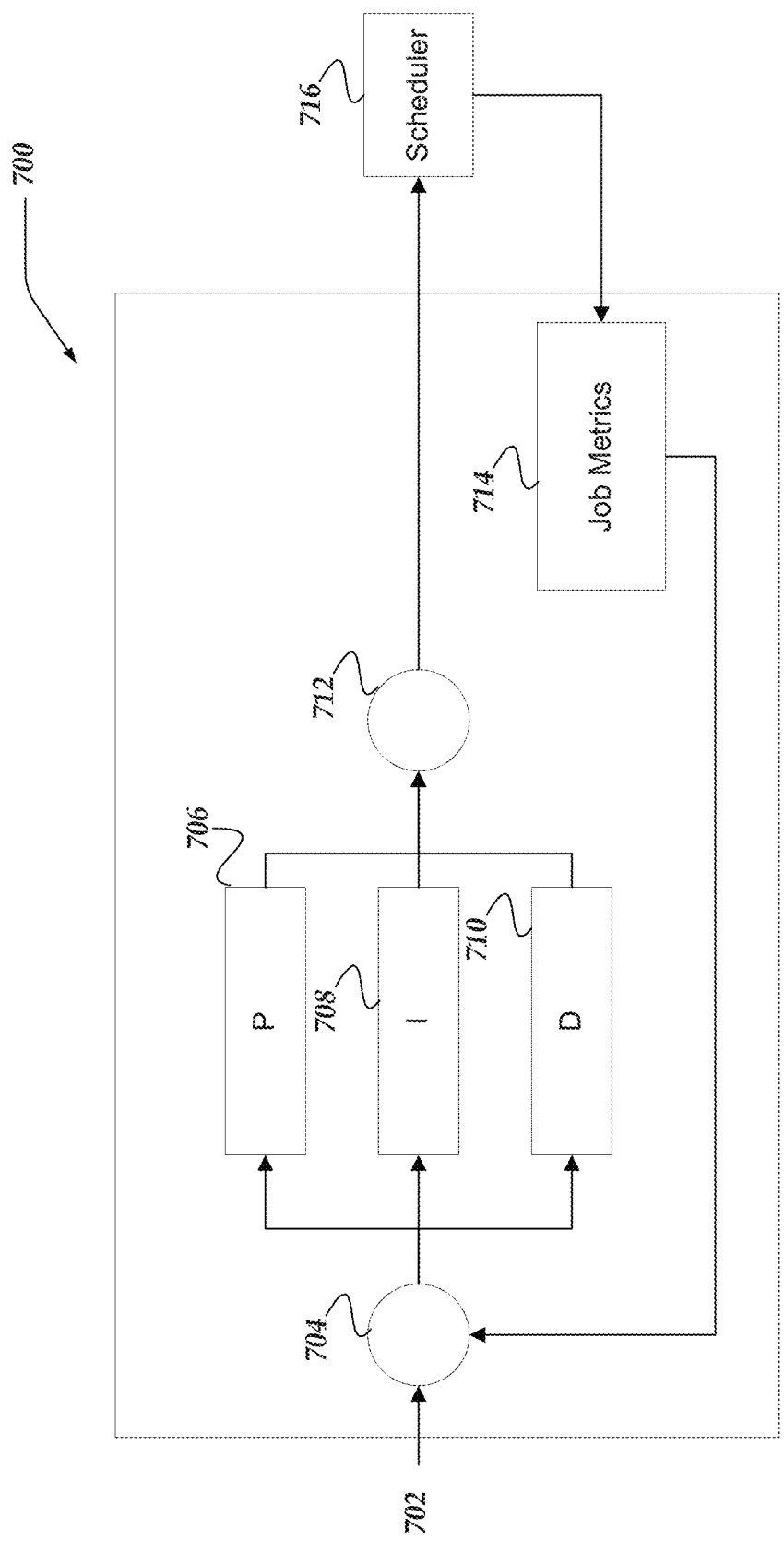
FIG. 7 illustrates a logical schematic of a control model for managing throughput fairness and quality of service in file systems in accordance with one or more of the various embodiments.

FIG. 7 illustrates a logical schematic of control model 700 for managing throughput fairness and quality of service in file systems in accordance with one or more of the various embodiments. In one or more of the various embodiments, controller engines may be arranged to employ control models to provide a scheduler information (target scores) to determine which client job commands to execute. Accordingly, in some embodiments, as client jobs are provided to a storage computer, the client jobs may be associated with a control model.

In one or more of the various embodiments, client models may be arranged to produce target scores comprised of one or more dimensionless scalar values that correspond to the performance or completion status of a client job. In some embodiments, the associated performance criteria, such as, latency, time remaining, timeouts, outstanding work, throughput utilization, or the like, may vary depending on the particular control model. However, in some embodiments, the target scores produced by control models may be arranged such that target scores from different control models may be compared independently of the criteria used by the control model that generated the target scores.

In one or more of the various embodiments, target scores provided by control models may be employed by a scheduler to control the 'speed' of jobs. As described above, in some embodiments, jobs associated with positive target score may be assumed to be behind schedule as defined by its associated control model. Similarly, in some embodiments, jobs associated with a negative target score may be assumed to be ahead of schedule as defined by its associated control model. Also, in some embodiments, jobs associated with a target score of zero (0) may be assumed to be on schedule as defined by its associated control model.

Also, in one or more of the various embodiments, how far ahead of schedule or how far behind schedule a job may be represented by the magnitude of a target score. For example, in some embodiments, if Job A has a target score of 100 and Job B has a target score of 200, the scheduler may be arranged to consider Job B farther behind that Job A.

In this example, for some embodiments, control model 700 represents an instance of a control model. In some embodiments, as described above, different types of control models may be employed for different types of jobs or different operational requirements of a given file system. Accordingly, in some embodiments, this example (control model 700) is presented as an example of a type of control model that may be used in the innovations disclosed herein. One of ordinary skill in the art will appreciate that these innovations contemplate other control models that may be employed depending on local circumstances or requirements of a given file system.

In this example, for some embodiments, control model 700 may be arranged to receive client jobs or client job information at an interface, such as, input interface 702. In some embodiments, this information may be provided via the job meta-data associated with a provided job. In some embodiments, accumulator 704 may be arranged to compute an error value that represents the difference between the job target and the one or more metrics provided via job metrics 714. In some embodiments, the error value may be measured based on the comparison of one or more metrics associated with the current job and a setpoint value that may be defined.

In some embodiments, the control model may be arranged to generate a correction value that may be based on proportional error engine 706, integral error engine 708, and derivative error engine 710. In this example, for some embodiments, proportional error engine 706 may be arranged to generate a partial target score value that may be proportional to the magnitude of the error value. In this example, for some embodiments, integral error engine 708 may be arranged to generate a partial target score value representing the historic cumulative error associated with the running job. Also, in this example, for some embodiments, derivative error engine 712 may be arranged to generate a partial target score value based on the current rate of change of the error value.

Accordingly, in this example, for some embodiments, the partial target score value may be summed by accumulator 712 to provide the target score for the client job. In some embodiments, control engines may be arranged to provide the target score to scheduler 716 that may determine which job commands should be executed by a storage device.

In one or more of the various embodiments, the particular functions executed by accumulator 704, proportional error engine 706, integral error engine 708, derivative error engine 710, accumulator 712 may be specific to a particular control model enabling control behavior to be tailored for different types of client jobs.

Likewise, in some embodiments, setpoint values may be provided by a function that includes various inputs such as time (t), or the like. In some embodiments, such functions may be different for different control models.

Also, in one or more of the various embodiments, job metrics 714 may be based on various metrics or functions of metrics that may be different for different control models. For example, in some embodiments, key metrics may include, remaining work (data to read or write), current throughput, number of jobs competing for the same resource, time remaining before a deadline or timeout may be reached, or the like.

Accordingly, in some embodiments, control models may be arranged to employ a function to generate a job status value based on the one or more metrics that may be compared to the current setpoint value for a client job.

As described above, in some embodiments, different types of control models may be employed for different types of jobs. For example, in some embodiments, some job types may be associated control models that may be linear, non-linear, constant, or the like.

In one or more of the various embodiments, for example, one or more client jobs associated with interactive clients (e.g., users) may be automatically assigned a constant target score of zero rather than a variable target score. Thus, in this example, other jobs that may have positive target values (e.g., behind schedule) may be given priority. However, in this example, for some embodiments, interactive users may be granted higher priority over jobs that may be ahead of schedule.

In one or more of the various embodiments, one or more control models may be based on machine learning models that employ one or more non-linear mechanisms to provide a target score given inputs or signals associated with a client job.

Further, in one or more of the various embodiments, one or more control models may be non-linear such that target scores may be discrete rather than continuous. For example, in some embodiments, a control model may be arranged to produce target scores of +100, 0, −100 depending on job metrics.

In one or more of the various embodiments, schedulers, such as scheduler 716 may be arranged to enable select job command for execution on a storage device based on a comparison of the target scores. Accordingly, in some embodiments, control models may be employed for scheduling as long as they produce a target score that a scheduler may compare against target scores provided by other control models.

Generalized Operations

FIGS. 8-12 represent generalized operations for predictive performance analysis for file systems in accordance with one or more of the various embodiments. In one or more of the various embodiments, processes 800, 900, 1000, 1100, and 1200 described in conjunction with FIGS. 8-12 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 8-12 may perform actions for managing throughput fairness and quality of service in file systems in accordance with at least one of the various embodiments or architectures such as those described in conjunction with FIGS. 4-7. Further, in one or more of the various embodiments, some or all of the actions performed by processes 800, 900, 1000, 1100, and 1200 may be executed in part by file system engine 322, control engine 324, or the like.

Figure 8:
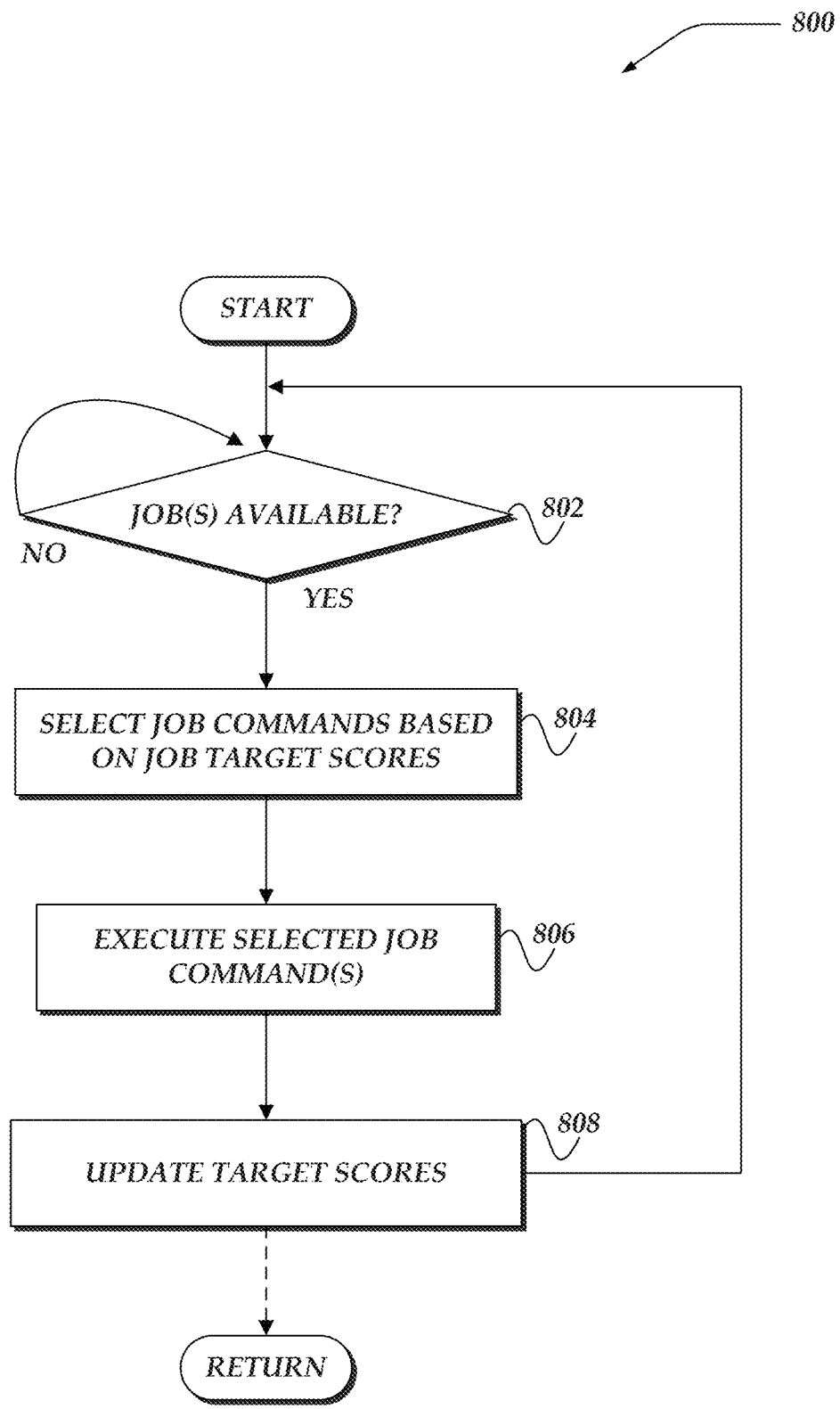
FIG. 8 illustrates an overview flowchart for a process for managing throughput fairness and quality of service in file systems in accordance with one or more of the various embodiments.

FIG. 8 illustrates an overview flowchart for process 800 for managing throughput fairness and quality of service in file systems in accordance with one or more of the various embodiments. After a start block, at decision block 802, in one or more of the various embodiments, if one or more client jobs may be available, control may flow to block 804; otherwise, control may loop back decision block 802. In one or more of the various embodiments, as file system clients, such as, users, services, maintenance processes, file system support processes, or the like, perform actions that require the file system, client jobs may be generated and distributed to storage computers (e.g., nodes) in the file system.

At block 804, in one or more of the various embodiments, control engines may be arranged to select one or more client job commands based on target scores associated with the one or more client jobs. As described above, client jobs may be associated with control models that may be employed to generate target scores. Accordingly, in one or more of the various embodiments, the target scores may be employed to select job commands for execution. As described above, in one or more of the various embodiments, client jobs associated with positive target scores may be considered jobs that may be behind schedule. Accordingly, in some embodiments, schedulers associated with the control engines may be arranged to preferentially select job commands for behind-schedule jobs over client jobs that may be ahead of schedule or on schedule. In some embodiments, the particular number of job commands to select or determining if job commands from more than one client job may be selected may vary depending on how a control engine or scheduler may be configured.

In one or more of the various embodiments, there may be one client job pending at a storage computer. Accordingly, in some embodiments, schedulers may be arranged to select at least one job command from the pending client job. Accordingly, in some embodiments, even if the single client job may be ahead of schedule, the scheduler may still select at least one job command for that client job.

At block 806, in one or more of the various embodiments, control engines may be arranged to execute one or more client job commands for the one or more client jobs. In some embodiments, the one or more selected job commands may be provided to a storage device for execution.

At block 808, in one or more of the various embodiments, control engines may be arranged to update the one or more target scores for the one or more client jobs. In one or more of the various embodiments, control engines may be arranged to provide one or more metric values associated with the execution of the client jobs to the control models associated with each client job. Accordingly, in one or more of the various embodiments, the target scores associated with the client jobs may be updated by their respective control models.

Next, in one or more of the various embodiments, control may be returned to a calling process.

Figure 9:
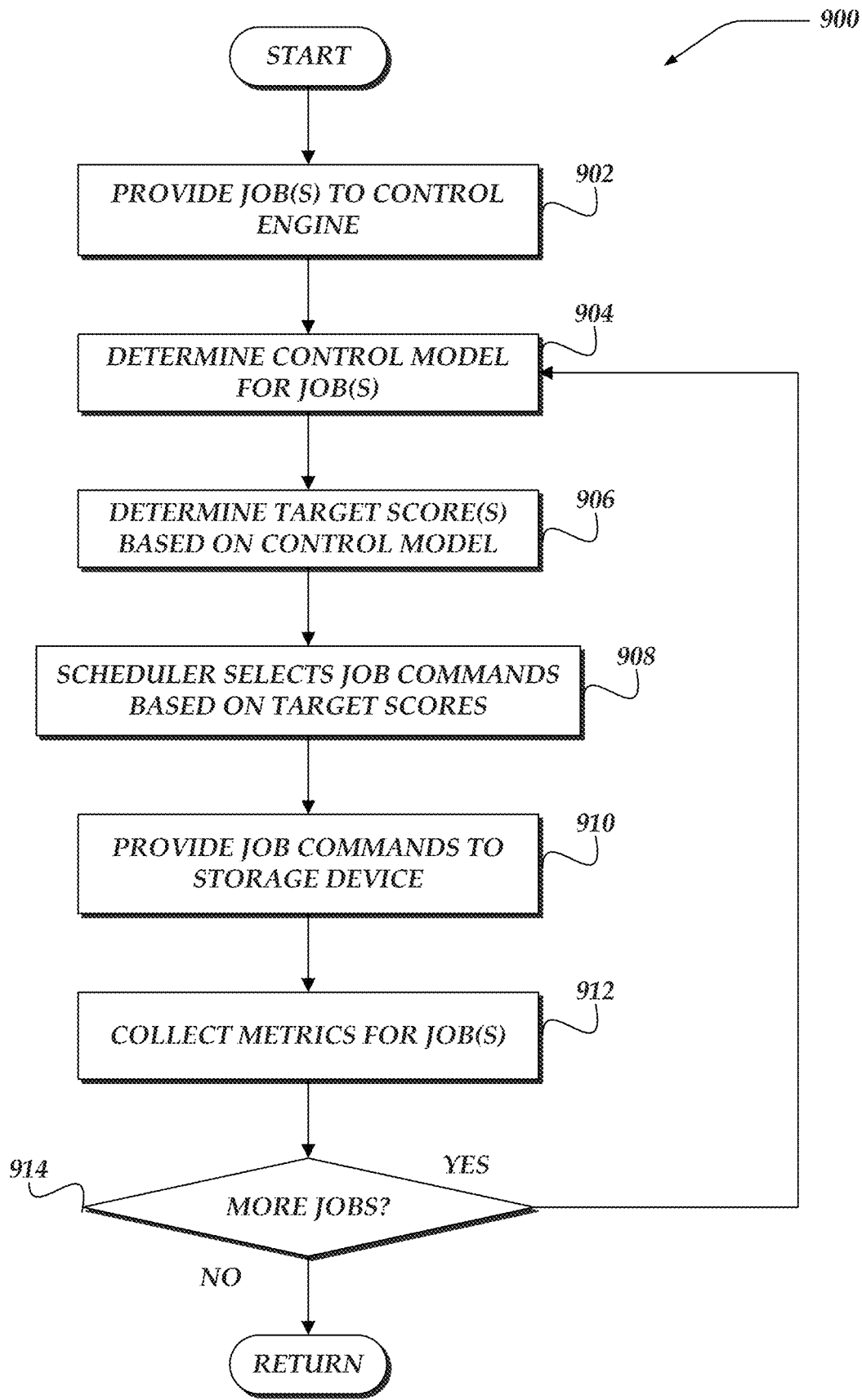
FIG. 9 illustrates a flowchart for a process for managing throughput fairness and quality of service in file systems in accordance with one or more of the various embodiments.

FIG. 9 illustrates a flowchart for process 900 for managing throughput fairness and quality of service in file systems in accordance with one or more of the various embodiments. After a start block, at block 902, in one or more of the various embodiments, one or more client jobs may be provided to a control engine. As described above, in some embodiments, various clients, including users, services, maintenance processes, file system support processes, or the like, or combination thereof, may be performing tasks that may require accessing storage devices in the file system. Accordingly, in one or more of the various embodiments, client jobs may be provided to distribute the tasks across the file system to various nodes or storage computers to perform the various actions associated with the required tasks.

In one or more of the various embodiments, the distribution of the client jobs may be managed by higher level systems that may rely on file system facilities, such as, path strings, indexes, file system data structures, or the like, to determine the storage devices for servicing a particular client job. Thus, in some embodiments, the client job may be assumed to include or be associated with one or more job commands that may be serviced by the one or more storage devices managed by the control engine. In some embodiments, other control engines that may be managing other storage devices may be managing other portions of a larger set of tasks that a client job may be part of.

At block 904, in one or more of the various embodiments, the control engines may be arranged to associate a control model with each of the one or more client jobs. In one or more of the various embodiments, control engines may be arranged to employ meta-data (e.g., job meta-data) that may be included with or associated with client jobs to determine the control models for each individual client job.

In some cases, in some embodiments, the same control model type may be associated with different client jobs. Thus, in one or more of the various embodiments, each client job may be assumed to be associated with an individual instance of a control model of a given type. However, for brevity and clarity, the term 'control model' is employed interchangeably to describe different types of control models or different instances of control models depending on the context.

In one or more of the various embodiments, control engines may be arranged to associate particular client job types to particular control models. For example, in some embodiments, interactive user jobs may be associated with one type of control model while longer running support jobs may be associated with another type of control model. In one or more of the various embodiments, control models may be associated with client jobs based on a variety of factors, including, user role, process/task priority, type of support process (e.g., re-striping vs. replication), application type (e.g., streaming media, database queries, or the like), time of day, file system utilization metrics, or the like. Accordingly, in one or more of the various embodiments, control engines may be arranged to employ mapping rules, lookup tables, or the like, provided via configuration information to account for local circumstances or local requirements.

In one or more of the various embodiments, control engines may be arranged to employ some or all client job metadata or the client job characteristics as inputs to one or more machine learning models that may be trained or configured to select control models to associate with incoming client jobs.

At block 906, in one or more of the various embodiments, the control engines may be arranged to determine target scores for each client job based on the control model associated with each client job. In one or more of the various embodiments, target scores generated by control models may be based on various criteria. In some embodiments, different control models may be arranged to have different criteria. In some embodiments, some or all criteria may be provided to control engines as client job metadata. In other cases, for some embodiments, criteria may be defined in the control model.

In one or more of the various embodiments, a control model may define one or more metrics thresholds or ranges that on-schedule client jobs should meet. Thus, in some embodiments, if the client job metrics meet the thresholds or ranges, the job may be considered on schedule; otherwise, the job may be considered behind schedule or ahead of schedule.

In one or more of the various embodiments, control models may be arranged to generate target scores that may be compared or measured against target scores provided by other control models. Accordingly, in some embodiments, control engines may be arranged to provide target scores that may be dimensionless and normalized such that if the same target score value is provided by two or more control models the corresponding client jobs may be considered to be performing similarly.

However, in one or more of the various embodiments, control models may be arranged to employ different methods to produce target scores such that ahead-of-schedule, on-schedule, or behind-schedule may have different meanings for different client jobs. Likewise, in one or more of the various embodiments, different control models may be arranged to employ different metrics to generate target scores. For example, in some embodiments, control model A may be arranged to use the amount of data to be read as a scheduling metric where control model B may be arranged to employ a running average of data transfer rate.

For example, in some embodiments, a control model may be arranged to establish a setpoint value that may be compared to a measured or derived metric value associated with its associated pending client job. Accordingly, for example, the control model may generate a target score based on the difference between the setpoint value and the measured/derived metric value to compute an error value.

Thus, for example, a positive error value may result in the control model providing a positive target score that has a magnitude proportional to the magnitude of the error value. Similarly, for example, if the error value is a negative value, the target score may be a negative value indicating that the client job may be ahead of schedule.

In some embodiments, one or more control models may be arranged to output a constant target score for a given client job type. For example, in some embodiments, if control models may be arranged to always produce a target score of zero (0), the scheduler may assume that the job is on schedule. Thus, in this example, the scheduler will prioritize behind-schedule jobs and de-prioritize ahead-of-schedule jobs with respect to the jobs pinned to a target score of zero.

At block 908, in one or more of the various embodiments, schedulers may be arranged to select one or more job commands for execution based on the target scores. In one or more of the various embodiments, schedulers may be provided to the one or more target scores produced by the control models. Accordingly, in some embodiments, scheduler may be arranged to allocate or select job commands associated with client jobs based on a comparison or ranking of the target scores.

In some embodiments, storage devices may be enabled to accept more than one job command at a time. For example, in some embodiments, some storage devices (e.g., SATA/AHCI devices) may be arranged to accept up to 32 job commands at a time that are executed in the order they are provided to the storage device.

Accordingly, in some embodiments, schedulers may be arranged to select one or more job commands from one or more client jobs for execution on the storage device. In some embodiments, schedulers may be arranged to select more job commands for client jobs that may be behind schedule than commands for jobs that may be on schedule or ahead of schedule. In some embodiments, schedulers may be arranged to proportionally allocate the number of commands selected per job based on the relative magnitude of the target scores.

In some embodiments, schedulers may be arranged to sort pending client jobs into an ordered list based on their associated target scores. In some embodiments, the ordered list may be employed to allocate job commands. Accordingly, in one or more of the various embodiments, client jobs that may be farthest behind schedule (e.g., largest positive target score) may be allocated the most commands while client jobs that may be less behind schedule may be allocated fewer job commands to run. And, in some embodiments, client jobs ahead of schedule or on schedule may be allocated few or no job commands.

In some embodiments, if all client jobs may be ahead of schedule, the scheduler may be arranged to allocate some job commands to keep the storage device busy (e.g., utilized) even though the pending jobs may be ahead of schedule.

In one or more of the various embodiments, schedulers may be arranged to restrict the number of job commands sent to storage devices to a limit less than the command capacity of the storage device. In one or more of the various embodiments, limiting the number of job commands sent at one time may reduce the time it may take for all of the commands to complete. In some cases, this may be advantageous because it may reduce the amount of time an incoming higher priority client job may have to wait while previously sent commands associated with lower priority client jobs execute. In one or more of the various embodiments, the command limit may vary depending on the size of the command buffer of a given storage device. Accordingly, in one or more of the various embodiments, the scheduler may be arranged to determine the command limit based on configuration information.

Note, in some embodiments, schedulers may be part of a control engine. In other embodiments, schedulers may be separate processes or scheduling engines.

At block 910, in one or more of the various embodiments, the scheduler may be arranged to provide the one or more selected job commands to a storage device. In one or more of the various embodiments, the selected job commands may be sent to the storage device in the determined order. Accordingly, in one or more of the various embodiments, the storage device may execute the commands as directed. Note, the particular actions performed for a given job command may vary depending on the storage device or its command protocol and may be assumed to be beyond the scope of the control engines or schedulers.

At block 912, in one or more of the various embodiments, the control engines may be arranged to collect one or more metrics associated with the one or more client jobs. In one or more of the various embodiments, control models associated with client jobs may be arranged to monitor one or more metrics associated with the performance of associated client jobs. In one or more of the various embodiments, the particular metrics (if any) may be collected for use in determining an updated target score for the running client jobs.

At decision block 914, in one or more of the various embodiments, if there may be more client jobs, control may loop back to block 904; otherwise, control may be returned to a calling process.

Figure 10:
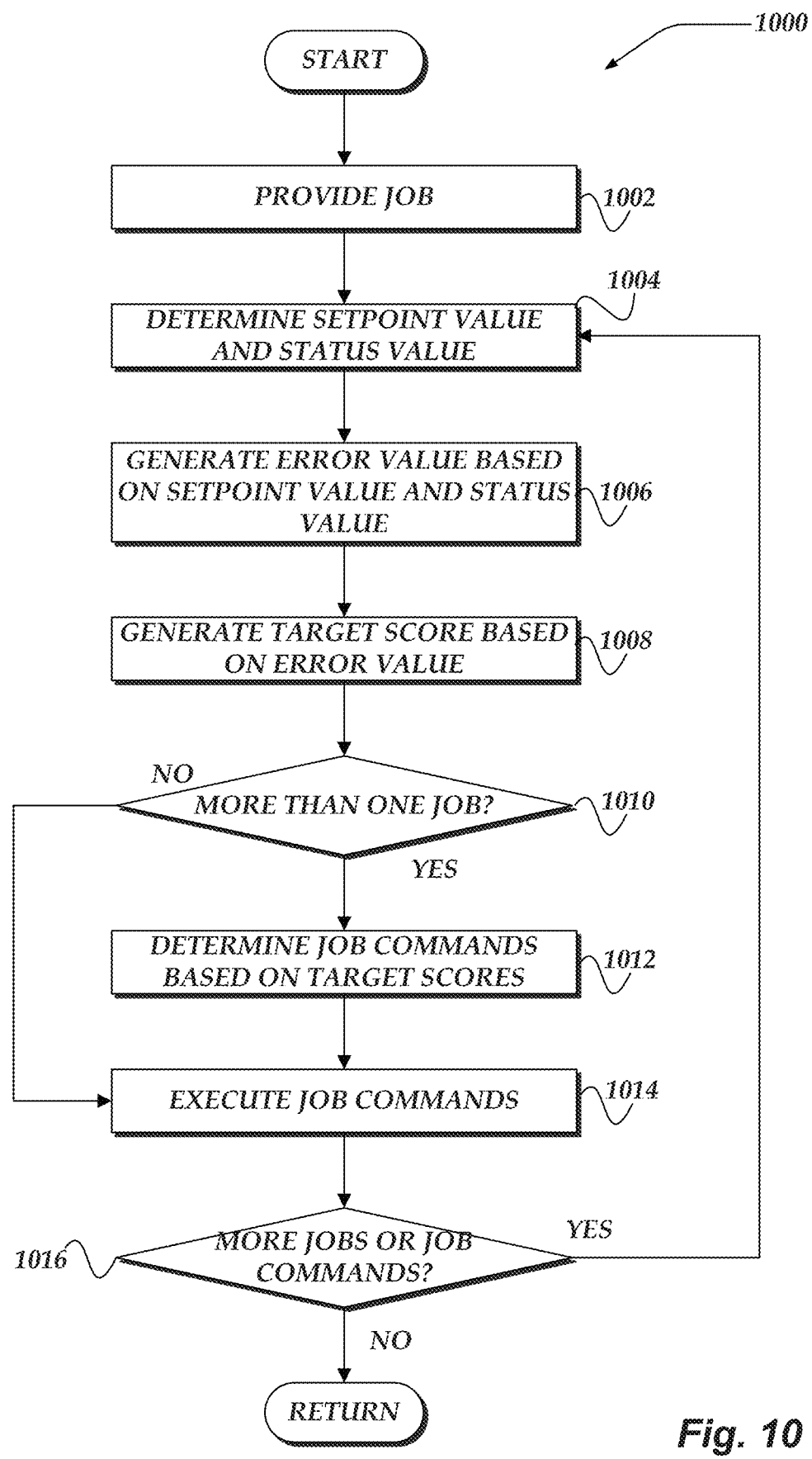
FIG. 10 illustrates a flowchart for a process for using a control model for managing throughput fairness and quality of service in file systems in accordance with one or more of the various embodiments.

FIG. 10 illustrates a flowchart for process 1000 for using a control model for managing throughput fairness and quality of service in file systems in accordance with one or more of the various embodiments. After a start block, at block 1002, in one or more of the various embodiments, a client job may be provided to a control engine.

At block 1004, in one or more of the various embodiments, the control model may be arranged to determine a setpoint value and a job status value associated with the client job. In one or more of the various embodiments, the setpoint value may be defined in the control model. In some embodiments, the setpoint value may be provided with the job meta-data. Also, in some embodiments, the setpoint value may be determined based on configuration information.

Also, in one or more of the various embodiments, the job status values may be determined or derived from one or more metrics associated with the one or more the client jobs or the execution of the client job.

At block 1006, in one or more of the various embodiments, the control model may be arranged to generate an error value based on the setpoint value and the job status value. For example, in some embodiments, the error value may be determined by subtracting the job status values from the setpoint value.

At block 1008, in one or more of the various embodiments, the control model may be arranged to generate a target score based on the error value. As described for control model 700 in FIG. 7, one or more error engines included in the control model may be arranged to generate partial target scores based on the error value. In some embodiments, error values associated with a client job falling behind schedule may result in an increased target score; error values associated with a client job becoming ahead of schedule may result in a decreased target score; and error values associated with a client job that may be on schedule may result in a target score moving closer to zero (0).

At decision block 1010, in one or more of the various embodiments, if there may be more than one client job, control may flow to block 1012; otherwise, control may flow block 1014.

At block 1012, in one or more of the various embodiments, a scheduler may be arranged to determine one or more job commands based on the target scores. As described above, in some embodiments, schedulers may be configured to select one or more job commands for one or more client jobs to execute on storage device. Accordingly, in some embodiments, schedulers may select which client job to service based on comparing the target scores associated with each client job.

In one or more of the various embodiments, scheduler may be arranged to determine more job commands for client jobs that may be falling behind schedule than other client jobs that may be ahead of schedule or on schedule. As described above, in some embodiments, the scheduler may employ the sign of a target score to determine if the client job is ahead of schedule or behind schedule and the magnitude of the target score to determine how far a client job a may be ahead or behind schedule.

At block 1014, in one or more of the various embodiments, the scheduler may be arranged to execute the one or more determined job commands. As described above, in some embodiments, the scheduler may provide the determined job commands to the storage device for execution.

At decision block 1016, in one or more of the various embodiments, if there may be more client jobs or more job commands, control may loop back to block 1004; otherwise, control may be returned to a calling process.

Figure 11:
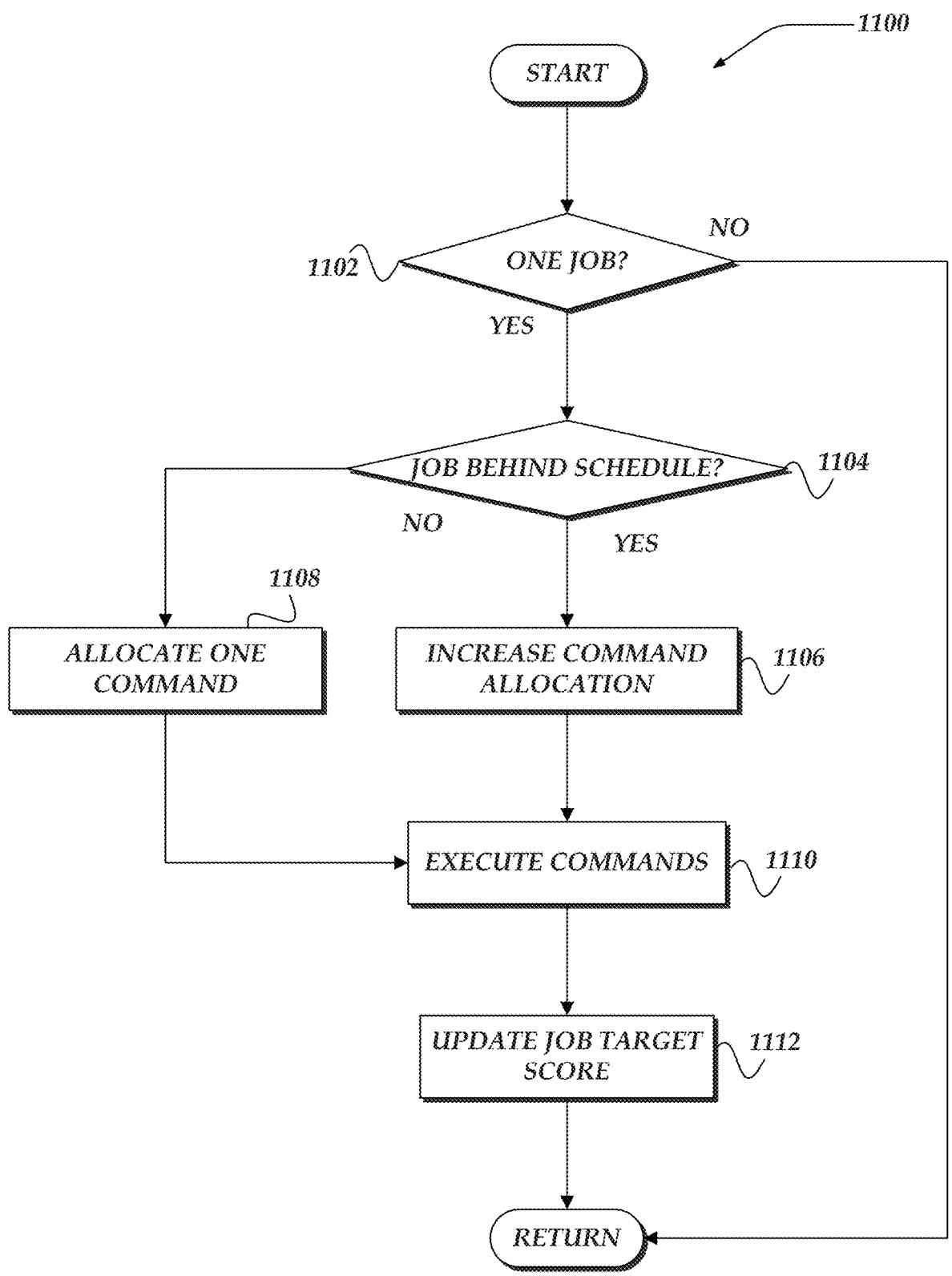
FIG. 11 illustrates a flowchart for a process for managing throughput fairness and quality of service in file systems in accordance with one or more of the various embodiments.

FIG. 11 illustrates a flowchart for process 1100 for managing throughput fairness and quality of service in file systems in accordance with one or more of the various embodiments. After a start block, at decision block 1102, in one or more of the various embodiments, if there may be one client job, control may flow to decision block 1104; otherwise, control may be returned to a calling process. Accordingly, in one or more of the various embodiments, control engines may be arranged to perform differently if there may be one client job.

In one or more of the various embodiments, similar to multi job cases, control engines may be arranged to determine a control model and associate it with the client job based on one or more characteristics of the client job. Accordingly, in some embodiments, control engines may be arranged to monitor the performance of the client job to determine if the client job is on schedule based on the target score produced by the control model.

At decision block 1104, in one or more of the various embodiments, if the client job may be behind schedule, control may flow to block 1106; otherwise, control may flow to block 1108. As described above, in some embodiments, control engines may be arranged to determine if a client job is on schedule based on the target score provided by the control model.

At block 1106, in one or more of the various embodiments, a scheduler may be arranged to increase the command allocation for the client job. As described above, if a client job may be behind schedule, schedulers may be arranged to execute more job commands for that client job in an attempt to get the client job back on schedule. Accordingly, in one or more of the various embodiments, one or more job commands associated with a behind schedule job may be selected for execution. In some embodiments, schedulers may be arranged to select a maximum number of job commands to send to the storage device to help the client job become on schedule.

In one or more of the various embodiments, the number of commands may be limited by the command protocol or storage device interface characteristics. For example, in some embodiments, the command protocol (e.g., SATA) may enable 32 commands to be sent at a time to a storage device. However, in some embodiments, schedulers may be arranged to establish a command limit that may be less than the maximum number supported. Accordingly, in some embodiments, schedulers may determine the maximum number of commands based on configuration information to account for local circumstances or local requirements. For example, for some embodiments, a scheduler may be configured send a maximum of 16 commands at a time for a given job to a storage device even though it may accommodate 32 commands.

Further, in one or more of the various embodiments, schedulers may be arranged to determine the number of commands to send based on the magnitude of the target score. Thus, in some embodiments, more job commands may be executed for client jobs that may be farther behind schedule than client jobs that may be less behind schedule. In some embodiments, schedulers may be arranged to determine the particular command selection strategy based on configuration information.

At block 1108, in one or more of the various embodiments, the scheduler may be arranged to allocate one command for execution. In one or more of the various embodiments, even though the client job may be ahead of schedule, its commands may still be executed rather than idling or otherwise suspending the job until it is no longer ahead of schedule.

However, in some embodiments, because the client job may be ahead of schedule, there may be no need to execute it faster by sending more than one command to the storage device. In one or more of the various embodiments, this behavior may be advantageous to avoid causing a subsequent higher priority client job from being delayed because it has to wait for several commands of an ahead-of-schedule or lower priority client job to complete before the newly arrived client job can begin executing. Thus, in some embodiments, the ahead-of-schedule job may continue to execute towards completion while not causing a long delay if a higher priority client job is provided to the same storage device.

At block 1110, in one or more of the various embodiments, the scheduler may be arranged to execute the client job commands. As described above, in some embodiments, the scheduler may provide the one or more job commands to the storage device for execution.

At block 1112, in one or more of the various embodiments, the control engine may be arranged to update the target score for the client job. In one or more of the various embodiments, if there may one client job, the control engines may be arranged to continue monitoring its completion metrics to employ the control model associated with the client job to generate target scores. Accordingly, in some embodiments, the scheduler may be informed if the client job may be ahead of schedule, on schedule, or behind schedule.

In some embodiments, if there may be more than one client job, each control model for each client job provides a target score as described above.

Next, in one or more of the various embodiments, control may be returned to a calling process.

Figure 12:
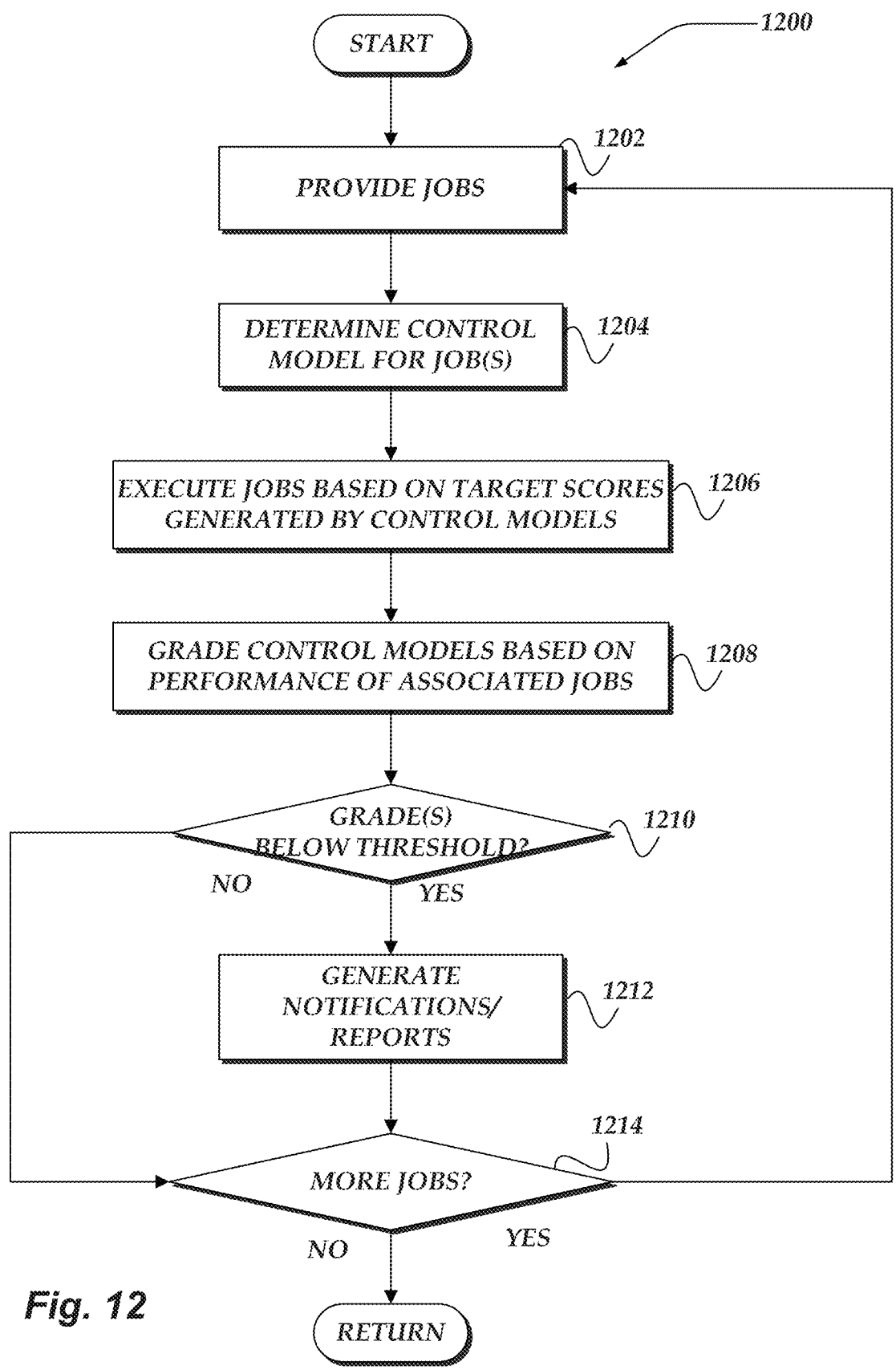
FIG. 12 illustrates a flowchart for a process for evaluating control models for managing throughput fairness and quality of service in file systems in accordance with one or more of the various embodiments.

FIG. 12 illustrates a flowchart for process 1200 for evaluating control models for managing throughput fairness and quality of service in file systems in accordance with one or more of the various embodiments. After a start block, at decision block 1202, in one or more of the various embodiments, one or more client jobs may be provided to a control engine. As described above, a file system management server computer may distribute one or more client jobs to various nodes in a file system.

At block 1204, in one or more of the various embodiments, the control engine may be arranged to determine control models for the one or more client jobs. As described above, control engines may be arranged to associate the one or more client jobs with control models based on one or more characteristics of each client job.

In one or more of the various embodiments, there may be more than one control model that may qualify for being associated with a given client job. Accordingly, in some embodiments, control engines may be arranged to randomly select a control model from among the two or more control models to associate with a given client job. In this context, random selection of control models may be based on rules or instructions provided via configuration information. For example, in some embodiments, one or more control models may be weighted to be selected more often than others.

In one or more of the various embodiments, one or more control models may be considered experimental in the sense that they may be introduced into the file system to evaluate their performance as compared against other control models. For example, in some embodiments, control engines may be arranged to associate experimental control models for Job Type A with 10% of Type A client jobs. Note, in one or more of the various embodiments, control engines may be arranged to employ configuration information to determine selection weights that may be associated with control models to account for local circumstances or local requirements.

At block 1206, in one or more of the various embodiments, the control engine may be arranged to execute the one or more client jobs based on target scores generated by the associated control models. As described above, control engines may be arranged to employ control models to determine how a scheduler may select or allocate commands to one or more storage devices.

At block 1208, in one or more of the various embodiments, the control engine may be arranged to grade the one or more control models based on the performance quality of the one or more associated client jobs. In one or more of the various embodiments, control engines may be arranged to monitor one or more efficiency or performance metrics associated with control models. In some embodiments, the particular metrics may vary depending on the type of client job. In some embodiments, such metrics may be related to tracking whether client jobs may be meeting various criteria. For example, in some embodiments, such criteria may include, meeting or exceeding completion deadlines or timeouts, utilization goals, latency or responsiveness goals, or the like.

Also, in one or more of the various embodiments, direct user feedback may be included a grading process as well, such as, feedback provided by surveys, or the like. Further, in some embodiments, passive monitoring of user activity may be employed to provide one or more metrics that may be employed in grading control models. For example, for some embodiments, in some cases, user dissatisfaction may be inferred if the same read operation is requested in rapid succession, perhaps indicating that the user is repeatedly executing the same operation (e.g., multiple mouse clicks to open a file) because the file system may seem unresponsive to that user.

Accordingly, in one or more of the various embodiments, control engines may be arranged to associate a performance grade or score with each control model. Note, in some embodiments, even if alternative control models may be unavailable for a given job type, grades may be maintained for control models.

At decision block 1210, in one or more of the various embodiments, if one or more grades associated with one or more control models may be below a threshold value, control may flow to block 1212; otherwise, control may flow to decision block 1214. In one or more of the various embodiments, control engines may be arranged to periodically evaluate control model grades to determine if there may be one or more control models that may be performing below standard.

Also, in one or more of the various embodiments, if experimental control models have been employed, grades of the experimental control models may be compared with grades of non-experimental control models. Accordingly, in one or more of the various embodiments, experimental control models that may have better performance than their counterpart production control models may be identified.

At block 1212, in one or more of the various embodiments, the control engine may be arranged to generate one or more notifications or one or more reports associated with the one or more control models that may have poor grades. In one or more of the various embodiments, control engines may be arranged to generate one or more notifications or reports that include information about control model grades. In some embodiments, these may include information about some or all control model grades. Also, in some embodiments, notifications or reports may be arranged to include information associated with experimental control models, such as, how they may compare to their non-experimental counterparts.

In one or more of the various embodiments, control engines may be arranged to determine notification or report formats, content, delivery mechanisms, delivery targets, or the like, based on configuration information to account for local circumstances or local requirements.

Also, in one or more of the various embodiments, control engines may be arranged to automatically put one or more experimental control models into regular use based on their grades exceeding the grades of their non-experimental counterparts. Further, in one or more of the various embodiments, control engines may be arranged to modify the selection weights associated with experimental control models. For example, in one or more of the various embodiments, if an experimental control model associated with a 10% selection weight has graded well, its weight may be automatically increased to 20%, or the like.

At decision block 1214, in one or more of the various embodiments, if there may be more client jobs, control may loop back to block 1202; otherwise, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing file systems over a network using one or more processors that execute instructions to perform actions, comprising:
   providing one or more jobs to a storage computer in a file system, wherein the storage computer is associated with one or more storage devices, and wherein the file system includes one or more storage computers;
   associating one or more control models with the one or more jobs based on one or more characteristics of the one or more jobs, wherein each control model is arranged to employ a proportional engine that generates a first partial target score proportional to a magnitude of an error value and an integral engine that generates a second partial target score based on a historic cumulative error associated with the one or more jobs and a derivative engine that generates a third partial target score based on a current rated of change the error value, and wherein the first, second and third partial target scores are accumulated to provide a target score;
   generating one or more scores based on the one or more control models associated with each job, wherein each job is associated with a target score provided by its associated control model, and wherein each job that is behind its corresponding schedule is associated with a higher score value than each other job that is either on its corresponding other schedule or ahead of its corresponding other schedule;

selecting one or more commands for execution on the one or more storage devices based on the one or more commands being associated with a job that is associated with the higher score value that is greater than one or more score values associated with one or more other jobs;

updating the one or more scores based on the one or more control models and one or more metrics; and ranking the one or more jobs based on the one or more updated scores, wherein one or more subsequent commands are selected and executed based on the ranking of the one or more jobs.

2. The method of claim 1, wherein associating the one or more control models with the one or more jobs, further comprises, determining one or more interactive jobs and one or more long-running jobs based on the one or more characteristic;

associating each interactive job with a first type of control model, wherein score values generated by the first control model are equivalent to zero; and associating each long-running job with a second type of control model, wherein score values generated by the second type of control model are based on a remainder of work to be completed by the each long-running job.

3. The method of claim 1, wherein updating the one or more scores, further comprising:

employing the one or more control models and the one or more metrics to determine one or more executing jobs that are one or more of ahead-of-schedule, on-schedule, or behind-schedule;

increasing each score associated with each behind-schedule executing job;

decreasing each score associated with each ahead-of-schedule executing job; and setting each score associated with each on-schedule job to zero.

4. The method of claim 1, wherein generating the one or more scores, further comprises:

providing a portion of the one or more metrics to a control model associated with the job;

generating an error value based on a difference of a setpoint value and the portion of the one or more metrics, wherein the setpoint value is defined by the control model; and providing the error value to one or more functions, including a current value function, a historic function, or a rate of change function to generate a score, wherein the score is a dimensionless scalar value.

5. The method of claim 1, wherein selecting the one or more commands for execution, further comprises:

increasing a number of commands for the one or more jobs that are behind schedule; and decreasing the number of commands for the one or more other jobs when the one or more jobs that are ahead of schedule.

6. The method of claim 1, further comprising, generating a rank ordered list of the one or more jobs based on the one or more score values, wherein the job associated with the higher score value is ranked ahead of each other job associated with a lower score value.

7. The method of claim 1, further comprising, monitoring the one or more metrics associated with the execution of the one or more jobs, wherein the one or more metrics are defined by each control model.

8. The method of claim 1, wherein selecting the one or more commands for execution, further comprises:

in response to one job being provided to the storage computer, performing further actions:

executing one command when the one job is on schedule;

executing one command when the one job is ahead of schedule; and executing more than one command when the one job is behind schedule.

9. A system for managing a file system comprising:

a network computer, comprising:

a transceiver that communicates over the network;

a memory that stores at least instructions; and one or more processors that execute instructions that perform actions, including:

providing one or more jobs to a storage computer in a file system, wherein the storage computer is associated with one or more storage devices, and wherein the file system includes one or more storage computers;

associating one or more control models with the one or more jobs based on one or more characteristics of the one or more jobs, wherein each control model is arranged to employ a proportional engine that generates a first partial target score proportional to a magnitude of an error value and an integral engine that generates a second partial target score based on a historic cumulative error associated with the one or more jobs and a derivative engine that generates a third partial target score based on a current rated of change the error value, and wherein the first, second and third partial target scores are accumulated to provide a target score;

generating one or more scores based on the one or more control models associated with each job, wherein each job is associated with a score provided by its associated control model, and wherein each job that is behind its corresponding schedule is associated with a higher score value than each other job that is either on its corresponding other schedule or ahead of its corresponding other schedule;

selecting one or more commands for execution on the one or more storage devices based on the one or more commands being associated with a job that is associated with the higher score value that is greater than one or more score values associated with one or more other jobs;

updating the one or more scores based on the one or more control models and one or more metrics; and ranking the one or more jobs based on the one or more updated scores, wherein one or more subsequent commands are selected and executed based on the ranking of the one or more jobs; and a client computer, comprising:

a transceiver that communicates over the network;

a memory that stores at least instructions; and one or more processors that execute instructions that perform actions, including, providing one or more of the one or more job.

10. The system of claim 9, wherein associating the one or more control models with the one or more jobs, further comprises, determining one or more interactive jobs and one or more long-running jobs based on the one or more characteristic;

associating each interactive job with a first type of control model, wherein score values generated by the first control model are equivalent to zero; and associating each long-running job with a second type of control model, wherein score values generated by the second type of control model are based on a remainder of work to be completed by the each long-running job.

11. The system of claim 9, wherein updating the one or more scores, further comprising:

employing the one or more control models and the one or more metrics to determine one or more executing jobs that are one or more of ahead-of-schedule, on-schedule, or behind-schedule;

increasing each score associated with each behind-schedule executing job;

decreasing each score associated with each ahead-of-schedule executing job; and setting each score associated with each on-schedule job to zero.

12. The system of claim 9, wherein generating the one or more scores, further comprises:

providing a portion of the one or more metrics to a control model associated with the job;

generating an error value based on a difference of a setpoint value and the portion of the one or more metrics, wherein the setpoint value is defined by the control model; and providing the error value to one or more functions, including a current value function, a historic function, or a rate of change function to generate a score, wherein the score is a dimensionless scalar value.

13. The system of claim 9, wherein selecting the one or more commands for execution, further comprises:

increasing a number of commands for the one or more jobs that are behind schedule; and decreasing the number of commands for the one or more other jobs when the one or more jobs that are ahead of schedule.

14. The system of claim 9, further comprising, generating a rank ordered list of the one or more jobs based on the one or more score values, wherein the job associated with the higher score value is ranked ahead of each other job associated with a lower score value.

15. The system of claim 9, further comprising, monitoring the one or more metrics associated with the execution of the one or more jobs, wherein the one or more metrics are defined by each control model.

16. The system of claim 9, wherein selecting the one or more commands for execution, further comprises:

in response to one job being provided to the storage computer, performing further actions:

executing one command when the one job is on schedule;
executing one command when the one job is ahead of schedule; and
executing more than one command when the one job is behind schedule.

17. A processor readable non-transitory storage media that includes instructions for managing a file system over a network, wherein execution of the instructions by one or more processors on one or more network computers performs actions, comprising:

providing one or more jobs to a storage computer in a file system, wherein the storage computer is associated with one or more storage devices, and wherein the file system includes one or more storage computers;

associating one or more control models with the one or more jobs based on one or more characteristics of the one or more jobs, wherein each control model is arranged to employ a proportional engine that generates a first partial target score proportional to a magnitude of an error value and an integral engine that generates a second partial target score based on a historic cumulative error associated with the one or more jobs and a derivative engine that generates a third partial target score based on a current rated of change the error value, and wherein the first, second and third partial target scores are accumulated to provide a target score;

generating one or more scores based on the one or more control models associated with each job, wherein each job is associated with a score provided by its associated control model, and wherein each job that is behind its corresponding schedule is associated with a higher score value than each other job that is either on its corresponding other schedule or ahead of its corresponding other schedule;

selecting one or more commands for execution on the one or more storage devices based on the one or more commands being associated with a job that is associated with the higher score value that is greater than one or more score values associated with one or more other jobs;

updating the one or more scores based on the one or more control models and one or more metrics; and ranking the one or more jobs based on the one or more updated scores, wherein one or more subsequent commands are selected and executed based on the ranking of the one or more jobs.

18. The media of claim 17, wherein associating the one or more control models with the one or more jobs, further comprises, determining one or more interactive jobs and one or more long-running jobs based on the one or more characteristic;

associating each interactive job with a first type of control model, wherein score values generated by the first control model are equivalent to zero; and associating each long-running job with a second type of control model, wherein score values generated by the second type of control model are based on a remainder of work to be completed by the each long-running job.

19. The media of claim 17, wherein updating the one or more scores, further comprising:

employing the one or more control models and the one or more metrics to determine one or more executing jobs that are one or more of ahead-of-schedule, on-schedule, or behind-schedule;

increasing each score associated with each behind-schedule executing job;

decreasing each score associated with each ahead-of-schedule executing job; and setting each score associated with each on-schedule job to zero.

20. The media of claim 17, wherein generating the one or more scores, further comprises:

providing a portion of the one or more metrics to a control model associated with the job;

generating an error value based on a difference of a setpoint value and the portion of the one or more metrics, wherein the setpoint value is defined by the control model; and providing the error value to one or more functions, including a current value function, a historic function, or a rate of change function to generate a score, wherein the score is a dimensionless scalar value.

21. The media of claim 17, wherein selecting the one or more commands for execution, further comprises:
   increasing a number of commands for the one or more jobs that are behind schedule; and
   decreasing the number of commands for the one or more other jobs when the one or more jobs that are ahead of schedule.

22. The media of claim 17, wherein the one or more processors of the network computer execute instructions that perform actions, further comprising, generating a rank ordered list of the one or more jobs based on the one or more score values, wherein the job associated with the higher score value is ranked ahead of each other job associated with a lower score value.

23. The media of claim 17, wherein the one or more processors of the network computer execute instructions that perform actions, further comprising, monitoring the one or more metrics associated with the execution of the one or more jobs, wherein the one or more metrics are defined by each control model.

24. A network computer for managing file systems, comprising:
   a transceiver that communicates over the network;
   a memory that stores at least instructions; and
   one or more processors that execute instructions that perform actions, including:
      providing one or more jobs to a storage computer in a file system, wherein the storage computer is associated with one or more storage devices, and wherein the file system includes one or more storage computers;
      associating one or more control models with the one or more jobs based on one or more characteristics of the one or more jobs, wherein each control model is arranged to employ a proportional engine that generates a first partial target score proportional to a magnitude of an error value and an integral engine that generates a second partial target score based on a historic cumulative error associated with the one or more jobs and a derivative engine that generates a third partial target score based on a current rated of change the error value, and wherein the first, second and third partial target scores are accumulated to provide a target score;
      generating one or more scores based on the one or more control models associated with each job, wherein each job is associated with a score provided by its associated control model, and wherein each job that is behind its corresponding schedule is associated with a higher score value than each other job that is either on its corresponding other schedule or ahead of its corresponding other schedule;
      selecting one or more commands for execution on the one or more storage devices based on the one or more commands being associated with a job that is associated with the higher score value that is greater than one or more score values associated with one or more other jobs;
      updating the one or more scores based on the one or more control models and one or more metrics; and
      ranking the one or more jobs based on the one or more updated scores, wherein one or more subsequent commands are selected and executed based on the ranking of the one or more jobs.

25. The network computer of claim 24, wherein associating the one or more control models with the one or more jobs, further comprises,
   determining one or more interactive jobs and one or more long-running jobs based on the one or more characteristic;
   associating each interactive job with a first type of control model, wherein score values generated by the first control model are equivalent to zero; and
   associating each long-running job with a second type of control model, wherein score values generated by the second type of control model are based on a remainder of work to be completed by the each long-running job.

26. The network computer of claim 24, wherein updating the one or more scores, further comprising:
   employing the one or more control models and the one or more metrics to determine one or more executing jobs that are one or more of ahead-of-schedule, on-schedule, or behind-schedule;
   increasing each score associated with each behind-schedule executing job;
   decreasing each score associated with each ahead-of-schedule executing job; and
   setting each score associated with each on-schedule job to zero.

27. The network computer of claim 24, wherein generating the one or more scores, further comprises:
   providing a portion of the one or more metrics to a control model associated with the job;
   generating an error value based on a difference of a setpoint value and the portion of the one or more metrics, wherein the setpoint value is defined by the control model; and
   providing the error value to one or more functions, including a current value function, a historic function, or a rate of change function to generate a score, wherein the score is a dimensionless scalar value.

28. The network computer of claim 24, wherein selecting the one or more commands for execution, further comprises:
   increasing a number of commands for the one or more jobs that are behind schedule; and
   decreasing the number of commands for the one or more other jobs when the one or more jobs that are ahead of schedule.

29. The network computer of claim 24, wherein the one or more processors execute instructions that perform actions, further comprising, generating a rank ordered list of the one or more jobs based on the one or more score values, wherein the job associated with the higher score value is ranked ahead of each other job associated with a lower score value.

30. The network computer of claim 24, wherein the one or more processors execute instructions that perform actions, further comprising, monitoring the one or more metrics associated with the execution of the one or more jobs, wherein the one or more metrics are defined by each control model.

* * * * *